(12) United States Patent
Sugimura et al.

(10) Patent No.: US 10,853,972 B2
(45) Date of Patent: Dec. 1, 2020

(54) APPARATUS FOR PROCESSING IMAGE AND METHOD THEREOF

(71) Applicant: FUJITSU LIMITED, Kawasaki (JP)

(72) Inventors: Masahiko Sugimura, Kawasaki (JP);
Yasutaka Moriwaki, Kawasaki (JP);
Hiroaki Takebe, Kawasaki (JP);
Takayuki Baba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 135 days.

(21) Appl. No.: 16/144,062

(22) Filed: Sep. 27, 2018

(65) Prior Publication Data
US 2019/0122391 A1  Apr. 25, 2019

(30) Foreign Application Priority Data

Oct. 23, 2017  (JP) ................. 2017-204706

(51) Int. Cl.
| | | |
|---|---|---|
| *G06T 7/00* | (2017.01) | |
| *G06T 7/90* | (2017.01) | |
| *G06T 7/33* | (2017.01) | |
| *G06T 7/32* | (2017.01) | |
| *G06K 9/00* | (2006.01) | |

(52) U.S. Cl.
CPC .............. *G06T 7/90* (2017.01); *G06K 9/00* (2013.01); *G06T 7/32* (2017.01); *G06T 7/337* (2017.01); *G06T 2207/10004* (2013.01); *G06T 2207/10024* (2013.01); *G06T 2207/20021* (2013.01)

(58) Field of Classification Search
CPC .. G06T 7/90; G06T 7/32; G06T 7/337; G06T 2207/10004; G06T 2207/10024; G06T 2207/20021; G06K 9/00
See application file for complete search history.

(56) References Cited

U.S. PATENT DOCUMENTS

| | | | | |
|---|---|---|---|---|
| 2006/0012840 A1* | 1/2006 | Fukuda | ............... | H04N 1/62 |
| | | | | 358/518 |
| 2011/0149069 A1* | 6/2011 | Ishii | ............... | G06K 9/4652 |
| | | | | 348/135 |
| 2018/0005080 A1* | 1/2018 | Sugimura | ............ | G06K 9/2054 |

FOREIGN PATENT DOCUMENTS

| | | |
|---|---|---|
| JP | 2003-162718 | 6/2003 |
| JP | 2008-033489 | 2/2008 |

OTHER PUBLICATIONS

M. Calonder et al., "BRIEF: Binary Robust Independent Elementary Features", In Proceedings of the European Conference on Computer Vision (ECCV) 2010, pp. 778-792 (15 pages).

* cited by examiner

*Primary Examiner* — Ping Y Hsieh
(74) *Attorney, Agent, or Firm* — Fujitsu Patent Center

(57) ABSTRACT

An apparatus for processing an image includes a memory and a processor coupled to the memory. The processor is configured to determine a base hue value based on a state of distribution of a first hue value of each pixel of at least one image. The processor is configured to convert the first hue value of each pixel of the at least one image into a second hue value based on the base hue value. The processor is configured to calculate a difference in the second hue value between pixels included in each of a plurality of pixel pairs set in at least one feature region in the at least one image. The processor is configured to calculate a local feature amount of each of the at least one feature region based on the difference in the second hue value.

6 Claims, 30 Drawing Sheets

FIG. 4

112 PIXEL PAIR MANAGEMENT TABLE

| ID | COORDINATE OF PIXEL PAIR ||
|---|---|---|
|  | FIRST PIXEL (s, t) | SECOND PIXEL (u, v) |
| 1 | (5, 4) | (30, 12) |
| 2 | (15, 7) | (20, 10) |
| 3 | (5, 22) | (13, 10) |
| 4 | (28, 15) | (5, 0) |
| ⋮ | ... | ... |
| 128 | (0, 5) | (10, 15) |

FIG. 10

INTERMEDIATE DATA MANAGEMENT TABLE 113

| ID | COORDI-NATE | LUMINANCE ABSOLUTE VALUE VECTOR | LUMINANCE NORM | LUMINANCE ABSOLUTE VALUE VECTOR | HUE NORM |
|---|---|---|---|---|---|
| 1 | (X1, Y1) | 00101011··· | 8 | 00101011··· | 31 |
| 2 | (X2, Y2) | 10011010··· | 87 | 10011010··· | 3 |
| 3 | (X3, Y3) | 01101100··· | 33 | 01101100··· | 91 |
| 4 | (X4, Y4) | 10010000··· | 101 | 10010000··· | 99 |
| ⋮ | ⋮ | ⋮ | ⋮ | ⋮ | ⋮ |

FIG. 12

114 — LUMINANCE FEATURE AMOUNT MANAGEMENT TABLE

| ID | COORDINATE | LUMINANCE FEATURE AMOUNT |
|---|---|---|
| 1 | ( X1, Y1 ) | 010100··· |
| 2 | ( X2, Y2 ) | 011011··· |
| 3 | ( X8, Y8 ) | 100100··· |
| 4 | ( X9, Y9 ) | 101011··· |
| ⋮ | ⋮ | ⋮ |

115 — HUE FEATURE AMOUNT MANAGEMENT TABLE

| ID | COORDINATE | HUE FEATURE AMOUNT |
|---|---|---|
| 1 | ( X3, Y3 ) | 100101··· |
| 2 | ( X4, Y5 ) | 100110··· |
| 3 | ( X6, Y7 ) | 011000··· |
| 4 | ( X8, Y8 ) | 100011··· |
| ⋮ | ⋮ | ⋮ |

IN CASE OF H1≦H2

IN CASE OF H1>H2

APPARATUS FOR PROCESSING IMAGE AND METHOD THEREOF

CROSS-REFERENCE TO RELATED APPLICATION

This application is based upon and claims the benefit of priority of the prior Japanese Patent Application No. 2017-204706, filed on Oct. 23, 2017, the entire contents of which are incorporated herein by reference.

FIELD

The embodiments discussed herein are related to an image processing apparatus and an image processing method.

BACKGROUND

In recent years, image matching techniques are widely being used in various fields. As one of methods of matching between images, there is a method of comparing the local feature amount at a feature point of a first image with the local feature amount at a feature point of a second image, and searching the feature point of the second image (hereinafter, referred to as a "correspondence point") corresponding to the feature point of the first image. By statistically processing the set of correspondence points found by the search, it is possible to recognize the presence of the first image or the position of the first image in the second image.

There is also a method of expressing the local feature amount used for searching the correspondence point as described above by a binary code. As a representative example thereof, there is BRIEF (Binary Robust Independent Elementary Features). BRIEF is expressed as a local feature amount calculated based on the luminance difference between pixels for each of plural pixel pairs arranged around a feature point. More specifically, a set of bit values (binary code) corresponding to the (positive or negative) sign of the luminance difference between pixels is calculated as the local feature amount. In this way, the method of expressing the local feature by the binary code has an advantage of being capable of calculating similarities between feature points by the high-speed calculation of the Hamming distance.

In the meantime, as an example of an image processing technique using hues, the following image processing system has been proposed. This image processing system maps pixels of an input image on the circumference of a hue circle based on the hue value, divides the hue circle by a variable division number, and rotates the divided hue circle at a variable rotation angle, thereby clustering the pixels. Then, an evaluation value based on the result of clustering is used to determine a parameter for clustering.

Related techniques are disclosed in, for example, Japanese Laid-Open Patent Publication No. 2003-162718.

Related techniques are disclosed in, for example, M. Calonder, V. Lepetit, C. Strecha, and P. Fua., "BRIEF: Binary Robust Independent Elementary Features", In Proceedings of the European Conference on Computer Vision (ECCV), 2010

SUMMARY

According to an aspect of the present invention, provide is an apparatus for processing an image. The apparatus includes a memory and a processor coupled to the memory. The processor is configured to determine a base hue value based on a state of distribution of a first hue value of each pixel of at least one image. The processor is configured to convert the first hue value of each pixel of the at least one image into a second hue value based on the base hue value. The processor is configured to calculate a difference in the second hue value between pixels included in each of a plurality of pixel pairs set in at least one feature region in the at least one image. The processor is configured to calculate a local feature amount of each of the at least one feature region based on the difference in the second hue value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a view illustrating a configuration example of a pixel pair management table;

FIG. 10 is a view illustrating a configuration example of an intermediate data management table;

FIG. 12 is a view illustrating a configuration example of a luminance feature amount management table and a hue feature amount management table;

DESCRIPTION OF EMBODIMENTS

In the above-described method of calculating each bit value of the binary code indicating the local feature amount based on the sign of the luminance difference between the pixels included in the pixel pair, the feature amount becomes unstable in a region where the luminance difference between the pixels is small, which may cause a problem that the accuracy of determination on similarity of images deteriorates. That is, in the region where the luminance difference between the pixels is small, since the luminance difference between the pixels included in the pixel pair is close to zero (0), the sign of the bit value tends to be inverted due to the influence of the state and noise of a light source at the time of photographing. Therefore, when a correspondence point of the second image corresponding to the feature point of the first image is searched using the local feature amount calculated from such a region, there is a high possibility that the search of the correct correspondence point fails. Such a failure of search will cause deterioration in the accuracy of determination on the similarity between images.

Hereinafter, embodiments of the present disclosure will be described with reference to the drawings.

First Embodiment

Figure 1:
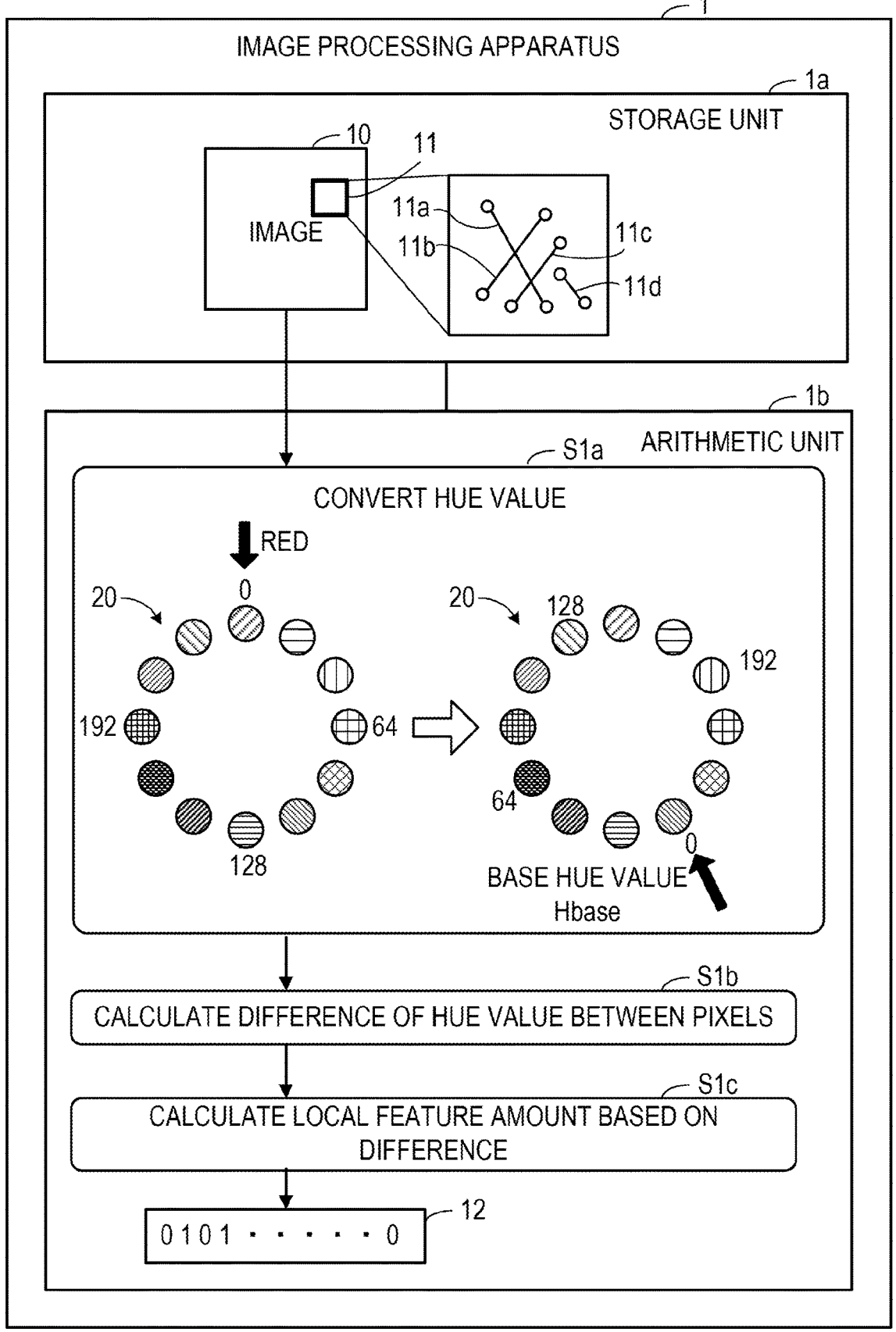
FIG. 1 is a view illustrating a configuration example and a processing example of an image processing apparatus according to a first embodiment.

FIG. 1 is a view illustrating a configuration example and a processing example of an image processing apparatus according to a first embodiment. The image processing apparatus 1 illustrated in FIG. 1 includes a storage unit 1a and an arithmetic unit 1b. The storage unit 1a is implemented with a storage device such as, for example, a RAM (Random Access Memory) or an HDD (Hard Disk Drive). The arithmetic unit 1b is implemented with, for example, a processor.

The storage unit 1a stores an image 10 as a feature amount calculation target. The feature amount is a set of local feature amounts calculated for each feature region set in the image 10. Plural pixel pairs are commonly set in each feature region. Then, the local feature amount corresponding to the feature region is calculated as a bit string in which bit values corresponding to each pixel pair in the feature region are arranged. In the example of FIG. 1, a feature region 11 is set in the image 10, and pixel pairs 11a to 11d are set in the feature region 11.

The arithmetic unit 1b calculates the feature amount of the image 10 based on the hue of each pixel of the image 10 stored in the storage unit 1a.

Here, in the method of calculating the bit value based on the sign of the luminance difference between the pixels included in the pixel pair, the luminance difference becomes close to 0 in a region where the luminance difference between the pixels is small. Therefore, the bit value is likely to be inverted due to the influence of photographing conditions, noise, or the like, and the value of the local feature amount becomes unstable. In the meantime, in the image region, there may be a region where the luminance difference between pixels is small but the hue difference is large. Therefore, by determining the bit value based on the hue difference between the pixels, the value of the local feature amount may be stabilized.

However, in the method of calculating the bit value based on the sign of the hue difference between pixels, there is a problem that the bit value is easily inverted for a specific hue due to the influence of photographing conditions, noise, or the like. This problem is caused by discontinuous assignment of hue values to hues on the hue circle.

The hue circle is a circle on which hues are arranged in order in an annular array. In the hue circle, since the hue continuously changes, there is no boundary. In the meantime, a digital value of hue (hue value) used in image processing is expressed as a numerical value within a finite range. For this reason, a boundary is provided for convenience on the hue circle, and a hue value on the boundary is set to 0. For example, in the Munsell color system, red (R) is disposed at a position directly above (angle 0°), a hue value is set to zero (0) with this position as a boundary, and hue values are assigned so as to increase in the clockwise direction. FIG. 1 illustrates a hue circle 20 on which hue values are assigned from the minimum value "0" to the maximum value "255" with red (R) as a reference.

In this way, the hue values become discontinuous values with a specific position on the hue circle as a boundary. Therefore, in a state in which the hue of the subject is in the vicinity of the boundary, when the photographing conditions of a light source or the generation conditions of noise are varied, there is a possibility that the hue values greatly fluctuate from the vicinity of the minimum value to the vicinity of the maximum value. As a result, the bit value is easily inverted and the value of the local feature amount becomes unstable.

To cope with this problem, the arithmetic unit 1b calculates a feature amount based on a hue value according to the following process.

First, the arithmetic unit 1b converts a first hue value of each pixel of the image 10 into a second hue value (step S1a). In this conversion, the second hue value is calculated with a base hue value Hbase determined based on the distribution state of first hue values in the image 10 as a reference. For example, based on the first hue value of each pixel of the image 10, a hue value with a low appearance frequency is set to the base hue value Hbase. Then, by changing the assignment of the hue value to a position on the hue circle so that the converted hue value in the base hue value Hbase becomes zero (0), the first hue value of each pixel of the image 10 is converted into the second hue value.

Next, the arithmetic unit 1b calculates a difference in second hue value between the pixels included in each of the pixel pairs 11a to 11d in the feature region 11 (step S1b). Then, the arithmetic unit 1b determines a bit value corresponding to each of the pixel pairs 11a to 11d based on the calculated difference and arranges the bit values thereof to calculate the local feature amount 12 for the feature region 11 (step S1c).

According to the converting process in step S1a, it is difficult for the second hue value obtained by the conversion to take a value in the vicinity of the base hue value Hbase which is a new boundary for hue value assignment. Therefore, there is a low possibility that the second hue value greatly fluctuates due to a difference in photographing conditions or the noise generation conditions. Accordingly, by determining a bit value corresponding to a pixel pair using this second hue value, it is difficult to invert the bit value in the feature region including a specific hue (red in the above example). As a result, the value of the local feature amount 12 is stabilized. That is, a feature amount with high robustness may be calculated.

In addition, by performing the above-described procedure, the local feature amount is calculated from each of the two images to be compared and the similarity between images is determined by comparing the local feature amounts of the images, thereby improving the accuracy of the determination.

Second Embodiment

Next, as a second embodiment, an image processing apparatus that receives a selection of a key image from plural stored images and searches for an image similar to the key image from images other than the key image will be described. The image processing apparatus according to the second embodiment is an example of an apparatus having the processing function of the image processing apparatus 1 according to the first embodiment.

In the second embodiment, a feature amount based on BRIEF is used as a feature amount of an image. However, the feature amount of an image may be also based on other types of binary feature amounts obtained by binarizing a difference of pixel value between the pixel pairs set in the vicinity of a feature point, such as ORB (Oriented fast and Rotated BRIEF) and BRISK (Binary Robust Invariant Scalable Keypoints).

Figure 2:
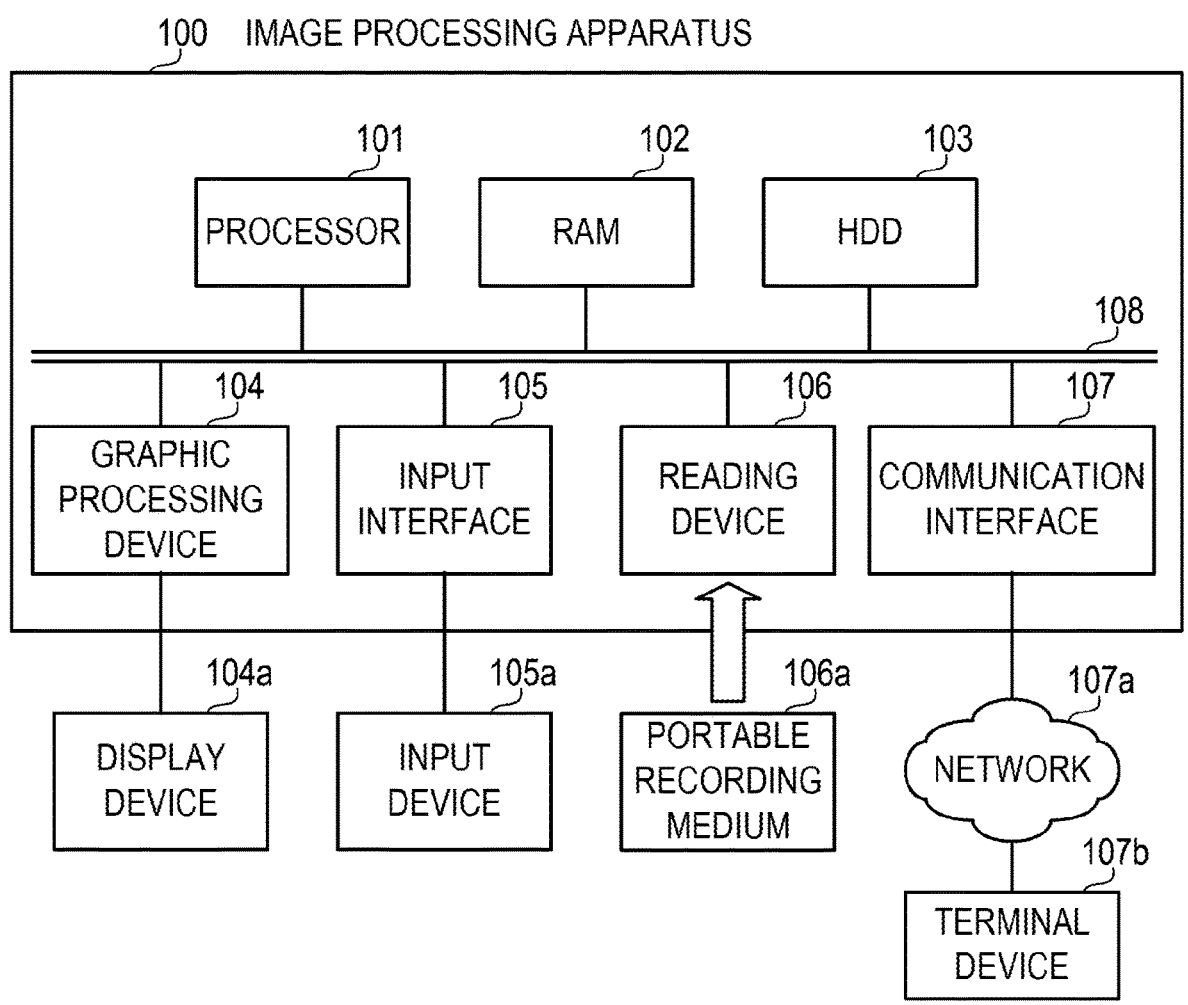
FIG. 2 is a view illustrating a hardware configuration example of an image processing apparatus according to a second embodiment.

FIG. 2 is a view illustrating a hardware configuration example of the image processing apparatus according to the second embodiment. The image processing apparatus 100 according to the second embodiment is implemented with, for example, a computer as illustrated in FIG. 2.

The overall operation of the image processing apparatus 100 is controlled by a processor 101. The processor 101 is, for example, a CPU (Central Processing Unit), an MPU (Micro Processing Unit), a DSP (Digital Signal Processor), an ASIC (Application Specific Integrated Circuit), or a PLD (Programmable Logic Device). Further, the processor 101 may be a combination of two or more of CPU, MPU, DSP, ASIC, and PLD.

The processor 101 is connected with a RAM 102 and plural peripheral devices via a bus 108.

The RAM 102 is used as a main storage device of the image processing apparatus 100. The RAM 102 temporarily stores at least a portion of an OS (Operating System) program and an application program to be executed by the processor 101. Various data necessary for processing by the processor 101 are also stored in the RAM 102.

The peripheral devices connected to the bus 108 may include an HDD 103, a graphic processing device 104, an input interface 105, a reading device 106, and a communication interface 107.

The HDD 103 is used as an auxiliary storage device of the image processing apparatus 100. The HDD 103 stores an OS program, an application program, and various data. Further, other types of nonvolatile storage devices such as an SSD (Solid State Drive) may also be used as the auxiliary storage device.

A display device 104a is connected to the graphic processing device 104. The graphic processing device 104 displays an image on the display device 104a according to a command from the processor 101. Examples of the display device may include a liquid crystal display and an organic EL (Electroluminescence) display.

An input device 105a is connected to the input interface 105. The input interface 105 transmits a signal output from the input device 105a to the processor 101. Examples of the input device 105a may include a keyboard, a pointing device, and the like. Examples of the pointing device may include a mouse, a touch panel, a tablet, a touch pad, a track ball, and the like.

A portable recording medium 106a is attached to the reading device 106. The reading device 106 reads data recorded on the portable recording medium 106a and transmits the read data to the processor 101. Examples of the portable recording medium 106a may include an optical disk, a magneto-optical disk, a semiconductor memory, and the like.

The communication interface 107 exchanges data with other devices via a network 107a. A terminal device 107b is connected to the network 107a. The terminal device 107b serves as, for example, a supply source of plural images to be subjected to the above-described image search by the image processing apparatus 100. For example, images captured by an imaging device and accumulated in the terminal device 107b are uploaded from the terminal device 107b to the image processing apparatus 100. Further, when the terminal device 107b has an imaging function, images captured by and accumulated in the terminal device 107b are uploaded from the terminal device 107b to the image processing apparatus 100.

With the hardware configuration described above, the processing function of the image processing apparatus 100 may be implemented.

Meanwhile, data of plural images are stored in the storage device of the image processing apparatus 100 (e.g., the HDD 103). For example, these images may be stored in the storage device of the image processing apparatus 100 using the portable recording medium 106a or may be stored in the storage device of the image processing apparatus 100 via the network 107a.

These images stored in the storage device are, for example, images captured by an imaging device. In that case, in the image processing apparatus 100, for example, the following process is performed as photograph management software is executed.

A key image is selected from plural captured images in the storage device by a user's input operation. Then, the image processing apparatus 100 extracts a captured image of a scene similar to the key image from the captured images (hereinafter, referred to as "reference images") excluding the key image among the plural captured images in the storage device. For example, a reference image presumed to contain the same object as the object included in the key image is extracted as a captured image of the scene similar to the key image. Thus, for example, the user may retrieve images necessary for the material from the image processing apparatus 100 or collect and automatically arrange photos at the holding of the same event. Therefore, it is possible to provide the user with convenience and entertainment.

The image searching function of the image processing apparatus 100 may also be used for management of document contents such as presentation materials in addition to the management of captured images as described above. For example, data of plural documents are stored in the storage device of the image processing apparatus 100 and a key document is selected from these documents. For example, the image processing apparatus 100 may extract a document including a sentence whose appearance when displaying the document is similar to the key document from other documents, or may extract a document including the same image, table, graph, etc. as the key document from other documents. Thus, it is possible to reduce the working time for finding the document. In addition, reuse of past document assets in the past may be promoted to improve work efficiency.

The image searching function of the image processing apparatus 100 may also be used as an additional function of a medical image management system. For example, it may be used for automatically aligning an affected part on a CT (Computed Tomography) image or MRI (Magnetic Resonance Imaging) image photographed at plural times and determining a temporal change of the image of the affected part.

Such an image processing apparatus 100 is implemented with, for example, a terminal device operated by a user, such as a personal computer or a smartphone. Further, the image processing apparatus 100 may be implemented with a server apparatus on a network. In this case, the image data stored in the storage device of the image processing apparatus 100 are uploaded from the terminal device of the user to the image processing apparatus 100 via a network.

Figure 3:
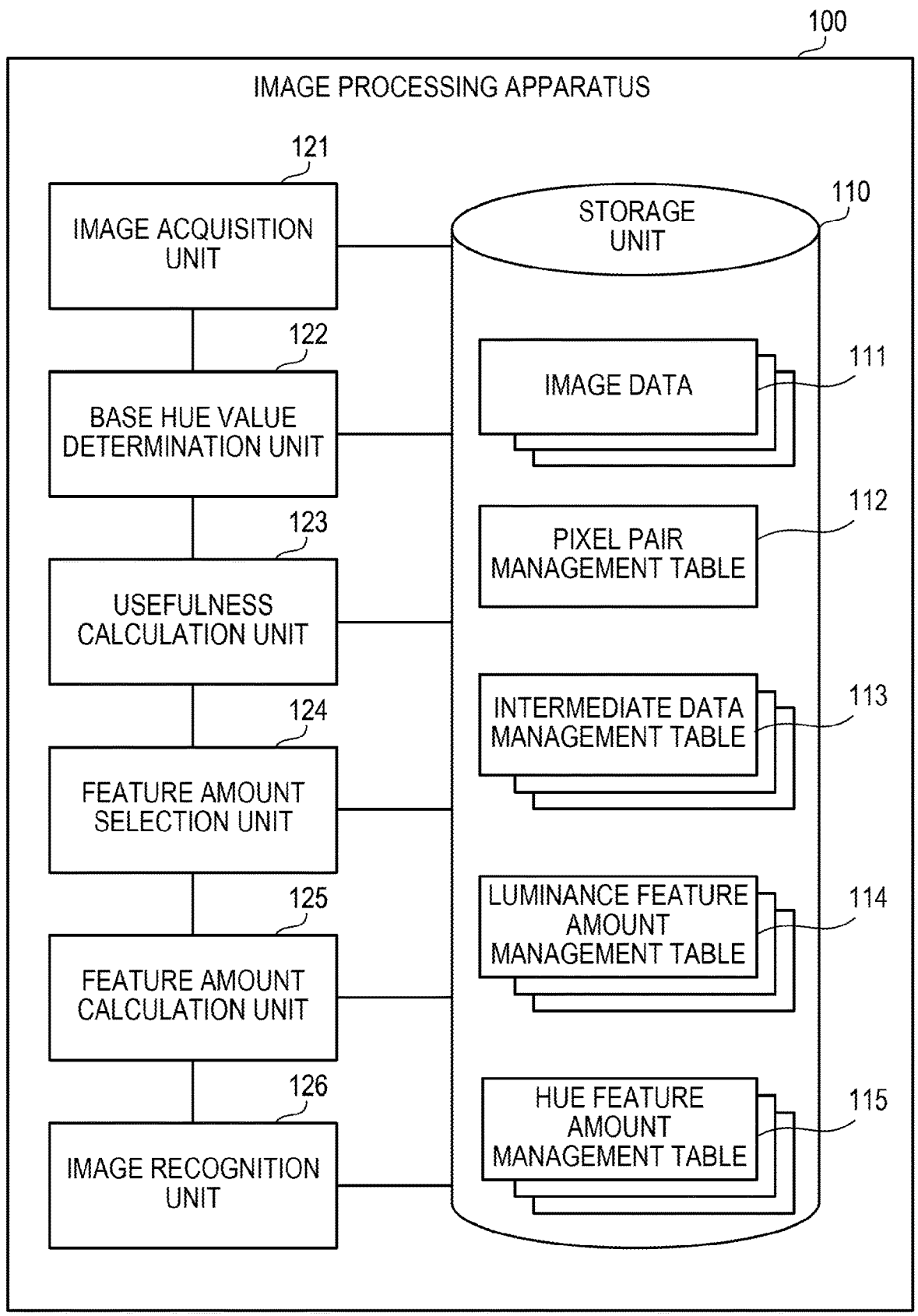
FIG. 3 is a block diagram illustrating a configuration example of a processing function of an image processing apparatus.

FIG. 3 is a block diagram illustrating a configuration example of the processing function of the image processing apparatus. The image processing apparatus 100 includes a storage unit 110, an image acquisition unit 121, a base hue value determination unit 122, a usefulness calculation unit 123, a feature amount selection unit 124, a feature amount calculation unit 125, and an image recognition unit 126. The storage unit 110 is an example of the storage unit 1a illustrated in FIG. 1 and the base hue value determination unit 122, the usefulness calculation unit 123, the feature amount selection unit 124, and the feature amount calculation unit 125 are examples of the arithmetic unit 1b illustrated in FIG. 1.

The storage unit 110 is mounted as a storage area of the storage device included in the image processing apparatus 100 (e.g., the RAM 102 or the HDD 103). The storage unit 110 stores image data 111, a pixel pair management table 112, an intermediate data management table 113, a luminance feature amount management table 114, and a hue feature amount management table 115.

Plural image data 111 are stored in the storage unit 110. Each of the image data 111 indicates data of an image used for similarity search (hereinafter, referred to as a "stored image"). In the similarity search, one key image is selected from the stored images and an image similar to the key image is searched from the remaining stored images (reference images).

The coordinates of pixel pairs used for calculating the feature amounts of the stored images are registered in the pixel pair management table 112.

The intermediate data management table 113 is prepared for each stored image. The intermediate data used in the process of calculating the feature amount of the corresponding stored image is temporarily registered in the intermediate data management table 113. As the intermediate data, a luminance absolute value vector, a hue absolute value vector, a luminance norm, and a hue norm, which will be described later, are registered.

Both the luminance feature amount management table 114 and the hue feature amount management table 115 are prepared for each stored image. A feature amount of each feature point in one stored image (local feature amount) is held by the luminance feature amount management table 114 and the hue feature amount management table 115 corresponding to the stored image. As will be described later, in the present embodiment, the feature points in the stored image are classified into a luminance feature point at which the luminance feature amount based on the luminance is calculated and a hue feature point at which the hue feature amount based on the hue is calculated. The luminance feature amount at the luminance feature point is registered in the luminance feature amount management table 114 and the hue feature amount at the hue feature point is registered in the hue feature amount management table 115.

The processing of the image acquisition unit 121, the base hue value determination unit 122, the usefulness calculation unit 123, the feature amount selection unit 124, the feature amount calculation unit 125, and the image recognition unit 126 is implemented, for example, by a predetermined application program being executed by the processor 101.

The image acquisition unit 121 acquires the image data 111 and stores the acquired image data 111 in the storage unit 110. For example, the image acquisition unit 121 acquires the image data 111 of the image captured by the imaging device via the portable recording medium 106a or via the network 107a.

The base hue value determination unit 122 determines a base hue value used for calculating the hue feature amount. The base hue value determination unit 122 calculates the base hue value based on the frequency of the hue value in all the stored images stored in the storage unit 110.

The usefulness calculation unit 123 calculates the usefulness indicating which of the luminance feature amount and the hue feature amount is useful as the local feature amount of each feature point of the stored image. Based on the calculated usefulness, the feature amount selection unit 124 selects either the luminance feature amount or the hue feature amount as the local feature amount of each feature point. In other words, the feature amount selection unit 124 classifies each feature point into one of the luminance feature point and the hue feature point based on the calculated usefulness.

The feature amount calculation unit 125 calculates the luminance feature amount or the hue feature amount corresponding to each feature point. The feature amount calculation unit 125 registers the calculated luminance feature amount in the luminance feature amount management table 114 and registers the calculated hue feature amount in the hue feature amount management table 115. As a result, the feature amount calculation unit 125 calculates the feature amount of each stored image and registers the calculated feature amount in the storage unit 110.

The image recognition unit 126 receives a selection operation of the key image and refers to the luminance feature amount management table 114 and the hue feature amount management table 115 to search a similar image similar to the key image from the stored images other than the selected key image.

A portion of the processing function of the image processing apparatus 100 may be provided in an external apparatus separated from the image processing apparatus 100. For example, the image acquisition unit 121, the base hue value determination unit 122, the usefulness calculation unit 123, the feature amount selection unit 124, and the feature amount calculation unit 125 may be provided in the terminal device 107*b*. In this case, the image processing apparatus 100 acquires the luminance feature amount management table 114 and the hue feature amount management table 115 generated by the terminal apparatus 107*b*. The image recognition unit 126 executes an image recognizing process based on the acquired luminance feature amount management table 114 and hue feature amount management table 115.

<Feature Amount Calculating Process>

Next, a feature amount calculating process by the image processing apparatus 100 will be described.

First, a method of setting a pixel pair in a feature region will be described. In the present embodiment, a pixel pair is set as follows in the same manner as when BRIEF is used as the feature amount.

Plural feature points are set in a stored image and a local feature amount is calculated for each feature point. The feature point is commonly set for plural stored images. In the present embodiment, as an example, it is assumed that Dense Sampling that sets feature points at equal intervals (e.g., 24 pixel intervals) on a stored image is used.

In addition, a certain region centered on each feature point is set as a feature region. The feature region is, for example, a rectangular region of 48 pixel square centered on the feature point. Further, plural pixel pairs are set in advance inside the feature region. The local feature amount of a certain feature point is calculated as a bit string formed by combining codes based on a difference in pixel value between pixel pairs in the corresponding feature region. In the BRIEF, each bit value of the bit string is determined based on the luminance difference, but in the present embodiment, depending on the feature point, each bit value may be determined based on the luminance difference or the hue difference.

FIG. 4 is a view illustrating a configuration example of a pixel pair management table. The coordinates of pixels included in a pixel pair are registered in the pixel pair management table 112 in advance. As illustrated in FIG. 4, an ID which identifies a pixel pair and the coordinates of a first pixel and a second pixel included in the pixel pair are registered in the pixel pair management table 112. The pixel pairs are set, for example, randomly. Information on the pixel pairs registered in the pixel pair management table 112 is commonly applied to all feature regions.

Next, a local feature amount calculating process using the pixel pair management table 112 will be described. In the following description, first, a first comparative example of a local feature amount calculating process and a problem thereof will be described with reference to FIGS. 5 and 6, and a second comparative example of the local feature amount calculating process and a problem thereof will be described with reference to FIG. 7. Then, the local feature amount calculating process according to the present embodiment will be described with reference to FIGS. 8 to 13.

Figure 5:
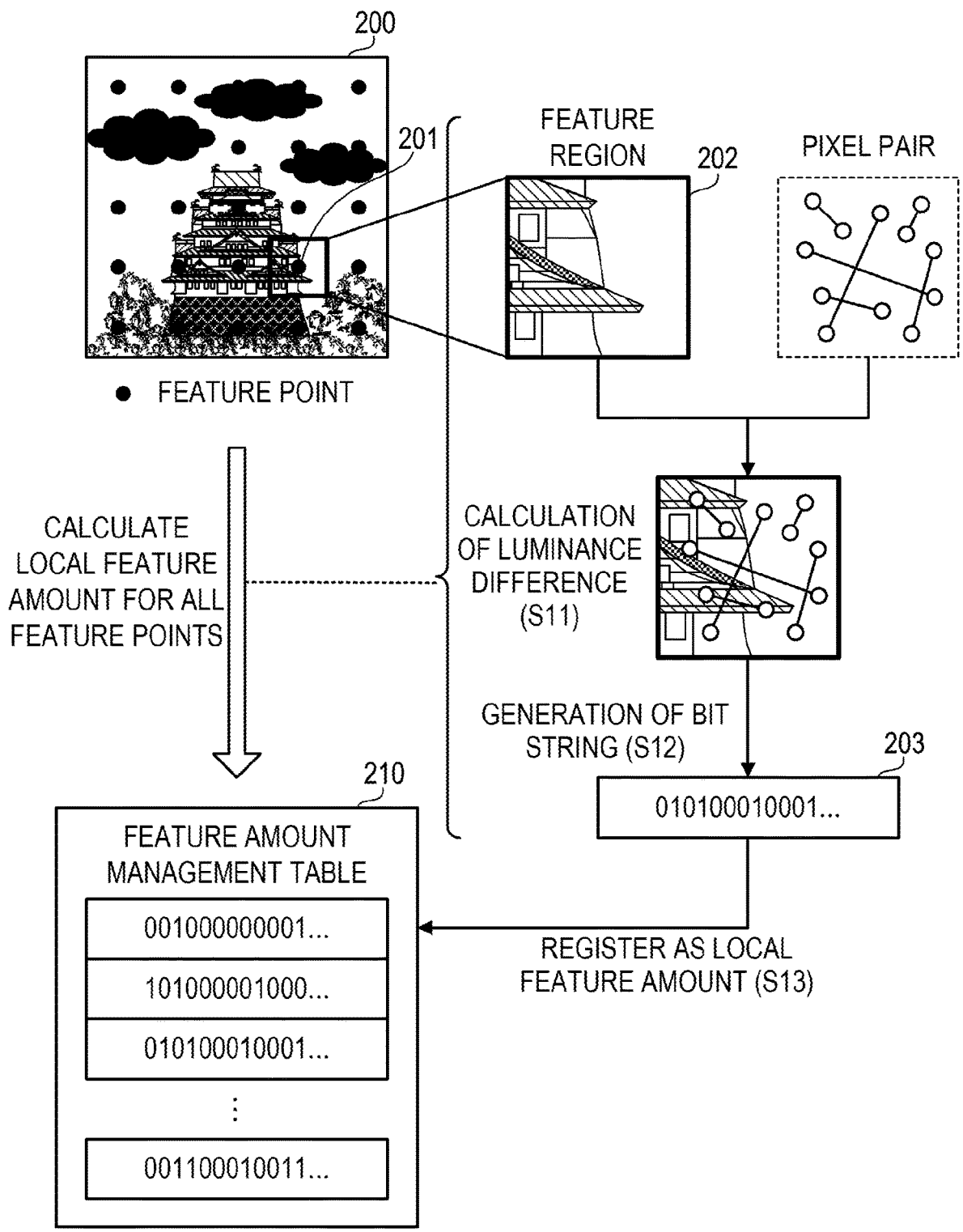
FIG. 5 is a view for explaining a first comparative example of a local feature amount calculating process.

FIG. 5 is a view for explaining the first comparative example of the local feature amount calculating process. As the first comparative example, an example of a process of using BRIEF as the local feature amount and registering the local feature amount of each feature point in an image 200 in a feature amount management table 210 corresponding to this image 200 is illustrated in FIG. 5.

For example, the local feature amount of a feature point 201 set in the image 200 is calculated as follows. First, a luminance difference of each pixel pair is calculated for a feature region 202 corresponding to the feature point 201 (step S11). For example, the luminance difference of the pixel pair is obtained by subtracting the luminance value of the second pixel from the luminance value of the first pixel in the pixel pair management table 112.

Next, a bit string 203 is generated by combining bit values corresponding to signs of the calculated luminance difference (step S12). Specifically, the bit values are set to 1 when the luminance difference has a positive value, and are set to zero (0) when the luminance difference is zero (0) or less. The bit values are determined in order of pixel pairs and added to the bit string 203. For example, when M sets of pixel pairs are set, a bit string 203 of M bits is generated. Next, the generated bit string 203 is registered in the feature amount management table 210 as the local feature amount of the feature point 201 (step S13).

In this manner, local feature amounts corresponding to all the feature points set in the image 200 (bit strings) are calculated and recorded in the feature amount management table 210 as feature amounts corresponding to the image 200.

However, as described above, when each bit value of the local feature amount is determined from the signs of the luminance difference, the luminance difference between the pixels becomes close to zero (0) in a region where the luminance difference of each pixel is small. Therefore, bit values are easily changed due to a delicate difference in photographing conditions of a light source and noise generation, which makes the value of the local feature amount unstable. This may result in deterioration of image recognition accuracy.

In the meantime, in the image region, there may be a region in which the luminance difference of each pixel is small but the hue difference is large. For example, colors contained in the same tone may be often used for signs or signboards designed by hand. Since the same tone includes colors with a large hue difference, a region in which objects designed by hand are photographed is likely to contain a region in which the luminance difference between pixels is small but the hue difference is large.

Figure 6A:
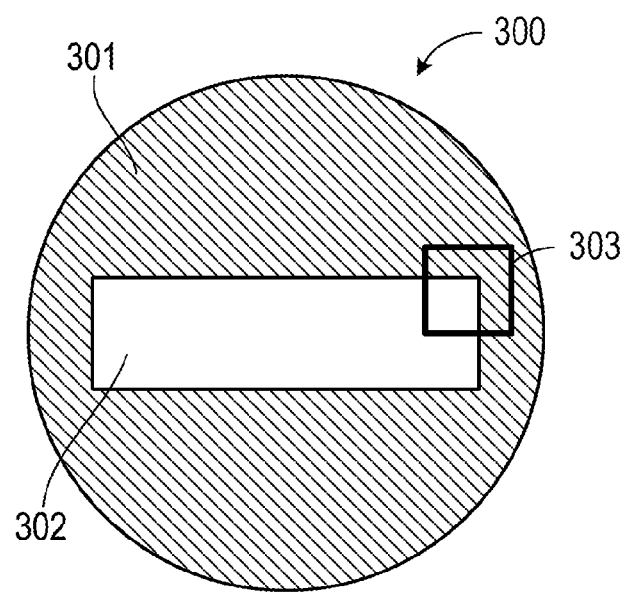
FIGS. 6A and 6B are views illustrating an example of a sign.
Figure 6B:
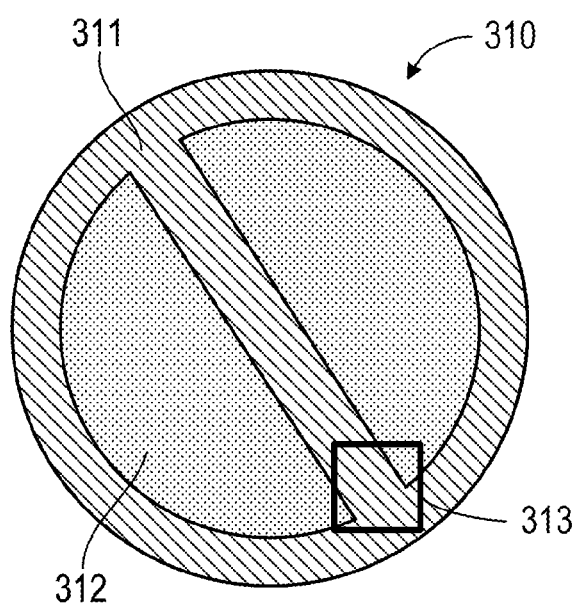

FIGS. 6A and 6B are views illustrating an example of a sign. A sign 300 illustrated in FIG. 6A includes regions 301 and 302, respectively, using two colors having a large luminance difference. For example, when a feature region 303 including a boundary between the regions 301 and 302 is set, the luminance difference between pixels included in the pixel pair tends to be large in this feature region 303. For this reason, there is a high possibility that a stable local feature amount may be calculated even when the luminance difference is used. That is, even when the illumination fluctuates or noise occurs, there is a high possibility that the local feature amount of the same value is calculated.

In the meantime, a sign 310 illustrated in FIG. 6B includes regions 311 and 312, respectively, using two colors having a large hue difference but a small luminance difference. For example, when a feature region 313 including a boundary between the regions 311 and 312 is set, since the luminance difference between the pixels included in the pixel pair becomes smaller in the feature region 313, the local feature amount calculated using the luminance difference tends to be unstable. That is, when the illumination fluctuates or noise occurs, there is a high possibility that the value of the calculated local feature amount changes.

In a region where the luminance difference of each pixel is small but the hue difference is large, such as in this feature region 313, by calculating the local feature amount based on the hue difference, it is possible to obtain a feature amount with high stability against illumination fluctuation and noise. Therefore, as a second comparative example, a method of executing image similarity determination using not only the local feature amount based on the luminance difference but also the local feature amount based on the hue difference may be considered.

Hereinafter, the local feature amount based on the luminance difference is referred to as a "luminance feature amount" and the local feature amount based on the hue difference is referred to as a "hue feature amount". In the second comparative example, it is assumed that the hue feature amount is expressed as a bit string similar to the luminance feature amount (i.e., BRIEF), but each bit value is determined based on the sign of the hue difference of each pixel included in the corresponding pixel pair.

Figure 7:
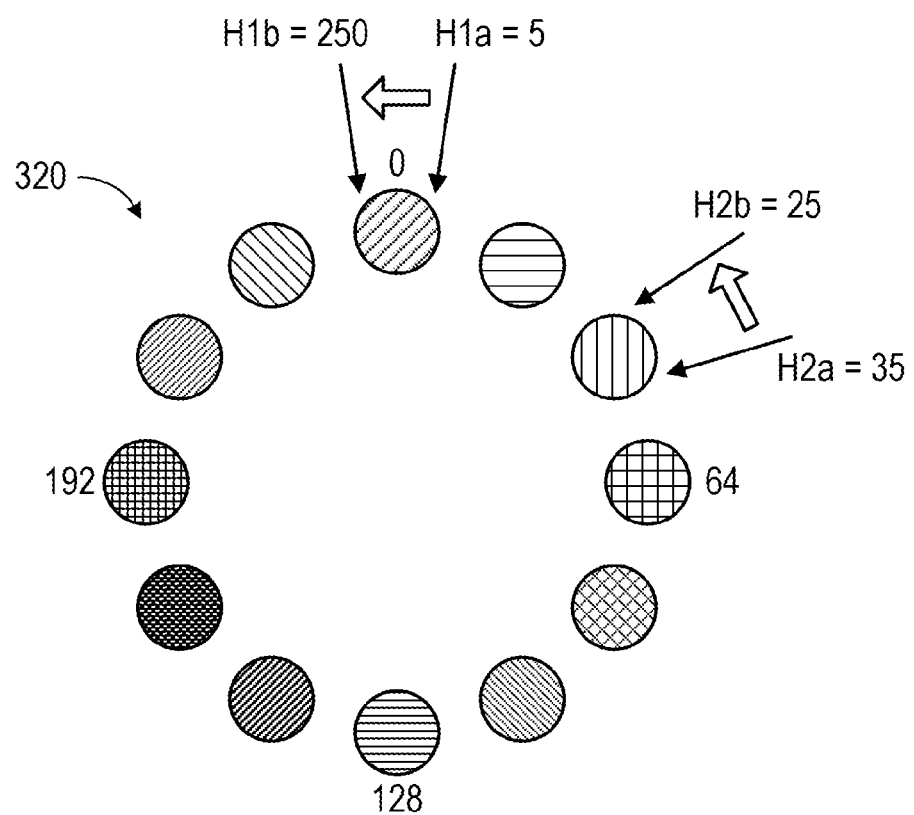
FIG. 7 is a view illustrating a relationship between a hue circle and a hue value.

FIG. 7 is a view illustrating a relationship between a hue circle and a hue value. A hue circle 320 is an array of hues arranged in an annular shape in order. In the hue circle 320, since the hue continuously changes, there is no boundary. In the meantime, the digital value of hue used in the image processing apparatus 100 (hue value) is expressed as a numerical value within a finite range. For this reason, a boundary is provided for convenience on the hue circle 320 and a hue value on the boundary is set to 0.

In the Munsell color system that is generally used, red (R) is disposed at a position directly above (angle 0°), and yellow (Y), green (G), blue (B), and purple (P) are disposed in the clockwise direction in order. In general, the position of red (R) is set as a boundary for determining a hue value and, with this boundary position set to hue value (=0), hue values are assigned such that a numerical value increases in the clockwise direction. In the present embodiment, it is assumed that the hue values are represented by 256 levels from 0 to 225 and the hue value at the position of red (R) is set to 0.

As described above, in the second comparative example, the bit value of the hue feature amount is determined based on the sign of the hue difference of each pixel included in the pixel pair. For example, when the hue value of the first pixel included in the pixel pair is 10 and the hue value of the second pixel is 100, since the hue difference is 0 or less, the bit value is determined to be 0.

However, this calculation method has the following problem. As described above, the hue values are discontinuous values across the boundary on the hue circle 320. Therefore, in a state where the hue of the subject is in the vicinity of the boundary, when there is a difference in photographing conditions of a light source or noise occurs, the hue values may fluctuate greatly from around the minimum value of 0 to around the maximum value of 255. As a result, the sign of the hue difference easily changes, which makes the value of the hue feature amount unstable.

For example, as illustrated in FIG. 7, under certain photographing conditions, it is assumed that a hue value H1a of the first pixel in the pixel pair is detected as 5 and a hue value H2a of the second pixel is detected as 35. In this case, since the hue difference is −30, the bit value of the hue feature amount is 0. Under other photographing conditions, it is assumed that the hue value of each pixel deviates in the counterclockwise direction on the hue circle 320 rather than the actual hue value. For example, it is assumed that a hue value H1b of the first pixel is detected as 250 and a hue value H2b of the second pixel is detected as 25. In this case, since the hue difference is 225, the bit value of the hue feature amount is 1. In this example, even when a difference in hue detection value due to the difference in photographing conditions is slight, the hue value of the first pixel largely fluctuates from 5 to 250 and, as a result, the bit value of the hue feature amount is inverted.

In this way, in the method of determining a bit value of the hue feature amount based on the sign of the hue difference, the bit value of the hue feature amount for a specific hue (red in the example of FIG. 7) may easily be inverted due to a difference in the photographing conditions or the noise generation conditions. As a result, the value of the hue feature amount becomes unstable, which may result in deterioration of image recognition accuracy.

To cope with this problem, in the present embodiment, a hue value calculated by a general method is converted so that the hue value of a pixel used for calculating the hue feature amount does not approach the value of a boundary region, and the hue value after the conversion is used for calculating the hue feature amount.

Figure 8:
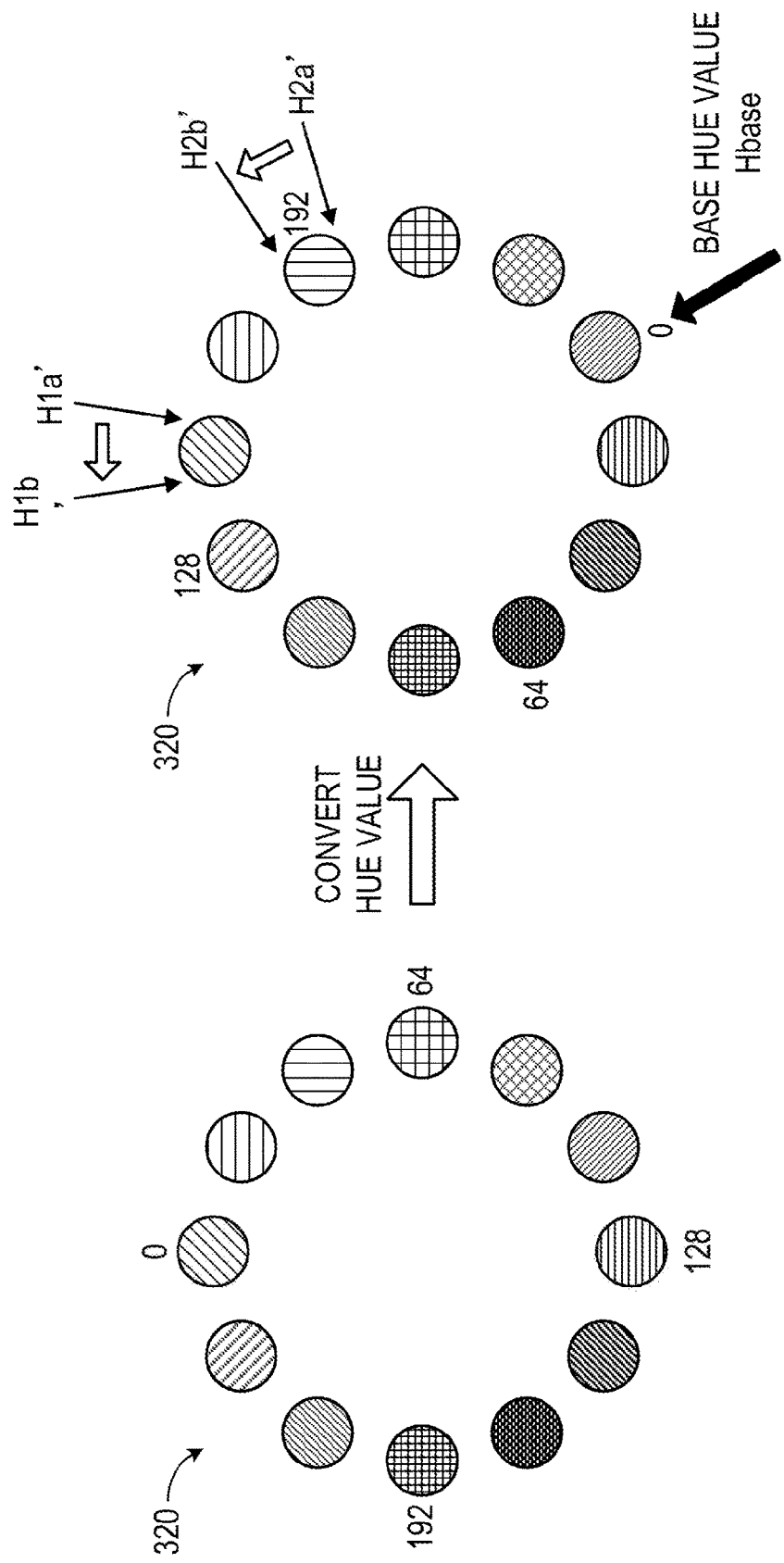
FIG. 8 is a view for explaining a method of converting a hue value.

FIG. 8 is a view for explaining a method of converting a hue value. In the present embodiment, a base hue value Hbase indicating a new boundary for calculating the hue value after conversion is determined by the base hue value determination unit 122. Based on the hue distribution in plural stored images to be searched, the base hue value Hbase is set to a hue value which is not used so much in these images. Specifically, the base hue value determination unit 122 calculates the frequency for each hue value in the plural stored images and determines the hue value having the lowest frequency as the base hue value Hbase.

Then, as illustrated on the right side in FIG. 8, the base hue value determination unit 122 converts the original hue value so that the hue value at the position of the base hue value Hbase becomes zero. Hereinafter, a hue value converted using the base hue value Hbase is referred to as a "converted hue value".

By setting the base hue value Hbase to a hue value which is not used so much, the converted hue value becomes hard to take a value near the base hue value Hbase which is a new boundary. As a result, there is a low possibility that the converted hue value greatly fluctuates due to the difference in photographing conditions and noise generation conditions. Therefore, it is difficult for the bit value of the hue feature amount to be inverted, so the value of the hue feature amount may be stabilized.

In FIG. 8, the converted hue values obtained by converting the hue values H1a and H1b of the first pixel and the hue values H2a and H2b of the second pixel illustrated in FIG. 7 using the base hue value Hbase are denoted by H1a', H1b', H2a', and H2b', respectively. By calculating the base hue value Hbase as a value far from the hue values H1a and H1b of the first pixel on the hue circle 320, no boundary is positioned between the converted hue value H1a' and the converted hue value H1b'. Therefore, even when the hue value of the first pixel changes from H1a to H1b, the value does not fluctuate greatly. As a result, regardless of which one of the hue values H1a and H2a and the hue values H1b and H2b is detected due to the difference in photographing conditions, the bit values of the hue feature amount are the same.

In the present embodiment, all of the plural stored images stored in the storage unit 110 are search targets, and the similarity between the key image selected from the plural stored images and all other reference images is determined. In such a process, it is preferable to calculate the frequency for each hue value by using as many stored images as possible among the stored images to be searched and calculate the base hue value Hbase based on the calculated frequency. In the present embodiment, it is assumed that the frequency for each hue value is calculated using all of the stored images to be searched. Further, for example, in a case of making determination of similarity between two images rather than performing image search as in the present embodiment, it is preferable to calculate the frequency for each hue value using both of the two images and calculate the base hue value Hbase based on the calculated frequency.

Further, in image recognition in the image searching process, when it is known in advance which kind of subject is recognized from a stored image, the base hue value Hbase may be arbitrarily set according to the subject. For example, in traffic signs, colors near green (G) are not used so much to improve visibility on the road. Therefore, when a traffic sign is recognized in image recognition, the base hue value Hbase may be set in advance to a hue value in the vicinity of green (G).

Next, the proper use of the luminance feature amount and the hue feature amount will be described.

As described above, the luminance feature amount is a local feature amount whose bit value is determined based on the sign of the luminance difference between pixels included in the pixel pair, which corresponds to BRIEF. In the meantime, in the present embodiment, the hue feature amount is a local feature amount whose bit value is determined based on the sign of the difference between the converted hue values of pixels included in the pixel pair. In the present embodiment, the image similarity determination is executed by using not only the luminance feature amount but also the hue feature amount, thereby improving the determination accuracy.

Here, as one example of a method using both the luminance feature amount and the hue feature amount, a method of calculating both the luminance feature amount and the hue feature amount of each feature point and using both local feature amounts to make image similarity determination may be considered. However, with this method, as the amount of computation of the local feature amount increases, the processing load for similarity determination increases and the processing time becomes longer.

Therefore, the image processing apparatus 100 according to the present embodiment calculates a "usefulness" indicating which of the luminance feature amount and the hue feature amount is more suitable for each feature point. Then, based on the usefulness, the image processing apparatus 100 selectively calculates the luminance feature amount and the hue feature amount of each feature point and uses the calculated local feature amount for an image recognizing process. Here, a usefulness calculating process by the usefulness calculation unit 123 will be described with reference to FIGS. 9 and 10.

Figure 9:
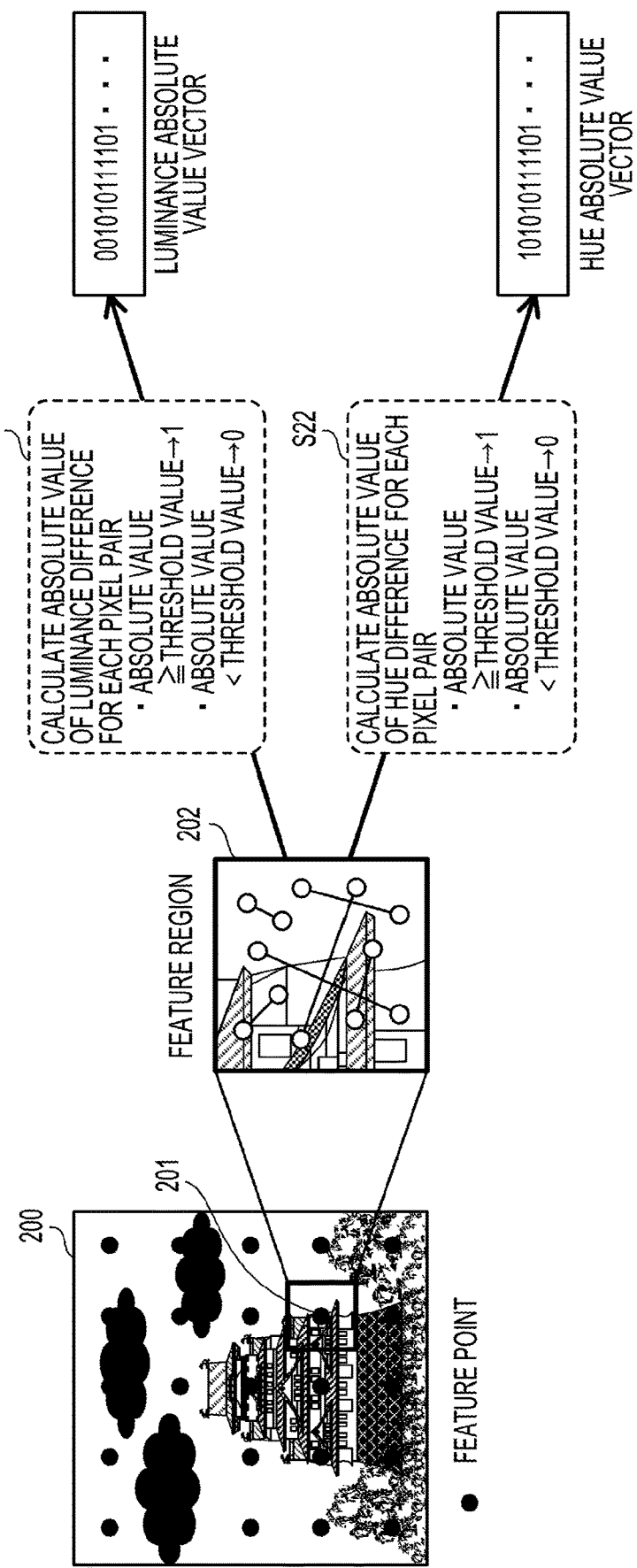
FIG. 9 is a view for explaining an absolute value vector calculating process.

FIG. 9 is a view for explaining an absolute value vector calculating process. The usefulness calculation unit 123 calculates a luminance absolute value vector and a hue absolute value vector for each feature point in a stored image as intermediate data for calculating the usefulness. Both the luminance absolute value vector and the hue absolute value vector are bit strings in which bit values corresponding to each pixel pair in a feature region are combined. Therefore, the luminance absolute value vector and the hue absolute value vector have the same number of digits as the local feature amount.

For example, the usefulness calculation unit 123 specifies a feature region 202 corresponding to a feature point 201 set in an image 200. The usefulness calculation unit 123 uses the luminance data of the feature region 202 to calculate the absolute value of the luminance difference between pixels included in each pixel pair. Then, the usefulness calculation unit 123 compares the calculated absolute value of the luminance difference with a predetermined threshold value which is larger than 0, sets the corresponding bit value to 1 when the absolute value of the luminance difference is equal to or larger than the threshold value, and sets the corresponding bit value to 0 when the absolute value of the luminance difference is smaller than the threshold value (step S21). By determining the bit value for each pixel pair according to such a procedure, the luminance absolute value vector is calculated.

In addition, the usefulness calculation unit 123 uses a converted hue value of the feature region 202 to calculate the absolute value of the difference between the converted hue values for each pixel included in each pixel pair. Then, the usefulness calculation unit 123 compares the calculated difference absolute value with the above-mentioned threshold value, sets the corresponding bit value to 1 when the difference absolute value is equal to or larger than the threshold value, and sets the corresponding bit value to 0 when the difference absolute value is smaller than the threshold value (step S22). By determining the bit value for each pixel pair according to such a procedure, the hue absolute value vector is calculated.

The fact that the bit value of the luminance absolute value vector is 1 indicates that the luminance difference for a pixel pair corresponding to the bit value is large. Therefore, the larger number of bit values "1" included in the luminance absolute value vector indicates the higher stability (i.e., the higher usefulness) of the luminance feature amount at the corresponding feature point. In addition, the fact that the bit value of the hue absolute value vector is 1 indicates that the hue difference for a pixel pair corresponding to the bit value is large. Therefore, the larger number of bit values "1" included in the hue absolute value vector indicates the higher stability (i.e., the higher usefulness) of the hue feature amount at the corresponding feature point.

FIG. 10 is a view illustrating a configuration example of an intermediate data management table. When calculating the usefulness for a stored image, the usefulness calculation unit 123 generates an intermediate data management table 113 corresponding to the stored image and stores the generated intermediate data management table 113 in the storage unit 110. An ID for identifying a feature point, the coordinate of the feature point, a luminance absolute value vector, a luminance norm, a hue absolute value vector, and a hue norm are registered in the intermediate data management table 113.

A record corresponding to each feature point set in the stored image is prepared in advance in the intermediate data management table 113, and the usefulness calculation unit 123 registers the luminance absolute value vector and the hue absolute value vector calculated for each feature point in the corresponding record. The luminance norm represents the norm of the luminance absolute value vector and the hue norm represents the norm of the hue absolute value vector. "Norm" indicates the number of "1"s included in a bit string. Therefore, the luminance norm represents the usefulness of the luminance feature amount and the hue norm represents the usefulness of the hue feature amount. That is, the larger luminance norm indicates the higher stability of the luminance feature amount and the larger hue norm indicates the higher stability of the hue feature amount.

The usefulness calculation unit 123 calculates a luminance norm based on the luminance absolute value vector for each feature point, calculates a hue norm based on the hue absolute value vector, and registers the calculated norms in a record corresponding to the feature point. As illustrated in the following FIG. 11, the luminance norm and the hue norm are used for determining which of the luminance feature amount and the hue feature amount is to be selected as the local feature amount corresponding to the feature point.

Figure 11:
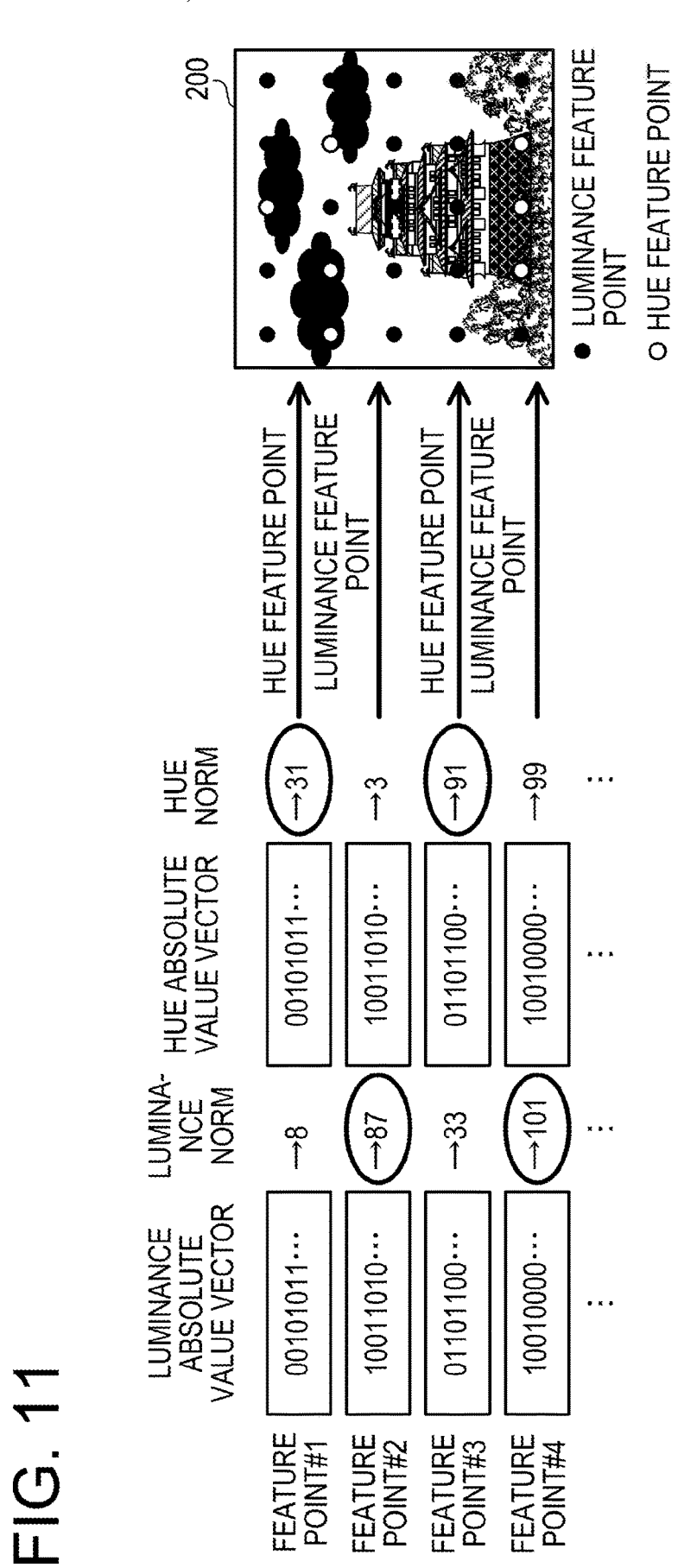
FIG. 11 is a view for explaining a local feature amount selecting process.

FIG. 11 is a view for explaining a local feature amount selecting process. The feature amount selection unit 124 compares the luminance norm and the hue norm calculated for each feature amount, selects the luminance feature amount as the local feature amount when the luminance norm is larger than the hue norm, and selects the hue feature amount as the local feature amount when the luminance norm is equal to or smaller than the hue norm.

Hereinafter, a feature point at which the luminance feature amount is selected is referred to as a "luminance feature point" and a feature point at which the hue feature amount is selected is referred to as a "hue feature point". Each feature point in a stored image is classified as either the luminance feature point or the hue feature point by the process of the feature amount selection unit 124. In the example of FIG. 11, a feature point #1 of an image 200 is classified as the hue feature point because the hue norm is larger than the luminance norm. A feature point #2 is classified as the luminance feature point because the luminance norm is larger than the hue norm. A feature point #3 is classified as the hue feature point because the hue norm is larger than the luminance norm. A feature point #4 is classified as the luminance feature point because the luminance norm is larger than the hue norm.

FIG. 12 is a view illustrating a configuration example of the luminance feature amount management table and the hue feature amount management table. When executing the above-described local feature amount selecting process for each feature point on a certain stored image, the feature amount selection unit 124 prepares the luminance feature amount management table 114 and the hue feature amount management table 115 corresponding to the stored image and stores the prepared luminance feature amount management table 114 and hue feature amount management table 115 in the storage unit 110. An ID for identifying a luminance feature point, the coordinate of the luminance feature point, and a luminance feature amount are registered in the luminance feature amount management table 114. An ID for identifying a hue feature point, the coordinate of the hue feature point, and a hue feature amount are registered in the hue feature amount management table 115.

Upon classifying the feature point as the luminance feature point, the feature amount selection unit 124 adds a record to the luminance feature amount management table 114 and registers the ID and coordinate of the luminance feature point in the record. Thereafter, when a luminance feature amount corresponding to the luminance feature point is calculated by the feature amount calculation unit 125, the luminance feature amount is registered in the corresponding record.

Upon classifying the feature point as the hue feature point, the feature amount selection unit 124 adds a record to the hue feature amount management table 115 and registers the ID and coordinate of the hue feature point in the record. Thereafter, when a hue feature amount corresponding to the hue feature point is calculated by the feature amount calculation unit 125, the hue feature amount is registered in the corresponding record.

Figure 13:
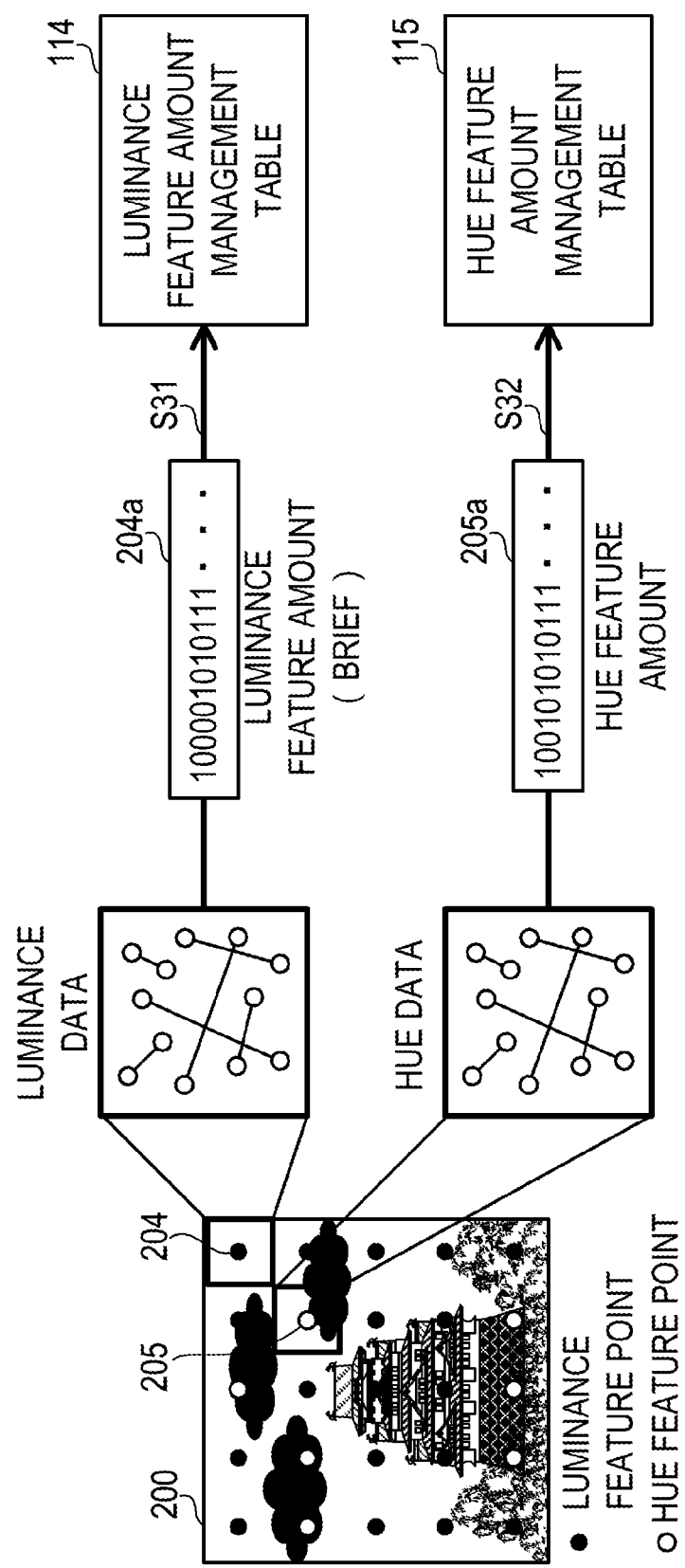
FIG. 13 is a view for explaining a local feature amount calculating process.

FIG. 13 is a view for explaining a local feature amount calculating process. For example, when a feature point 204 set in an image 200 is classified as a luminance feature point, the feature amount calculation unit 125 calculates a luminance feature amount (BRIEF) 204a based on the luminance data of a feature region corresponding to the feature point 204. The feature amount calculation unit 125 registers the calculated luminance feature amount 204a in a record corresponding to the feature point 204 of the luminance feature amount management table 114 (step S31).

Further, for example, when a feature point 205 set in the image 200 is classified as a hue feature point, the feature amount calculation unit 125 calculates a hue feature amount 205a based on the hue data of a feature region corresponding to the feature point 205. The feature amount calculation unit 125 registers the calculated hue feature amount 205a in a record corresponding to the feature point 205 of the hue feature amount management table 115 (step S32).

According to the above-described procedure, a feature amount of each stored image is calculated and registered in the storage unit 110.

<Image Recognizing Process>

Next, an image recognizing process by the image recognition unit 126 will be described with reference to FIGS. 14 to 16.

Figure 14:
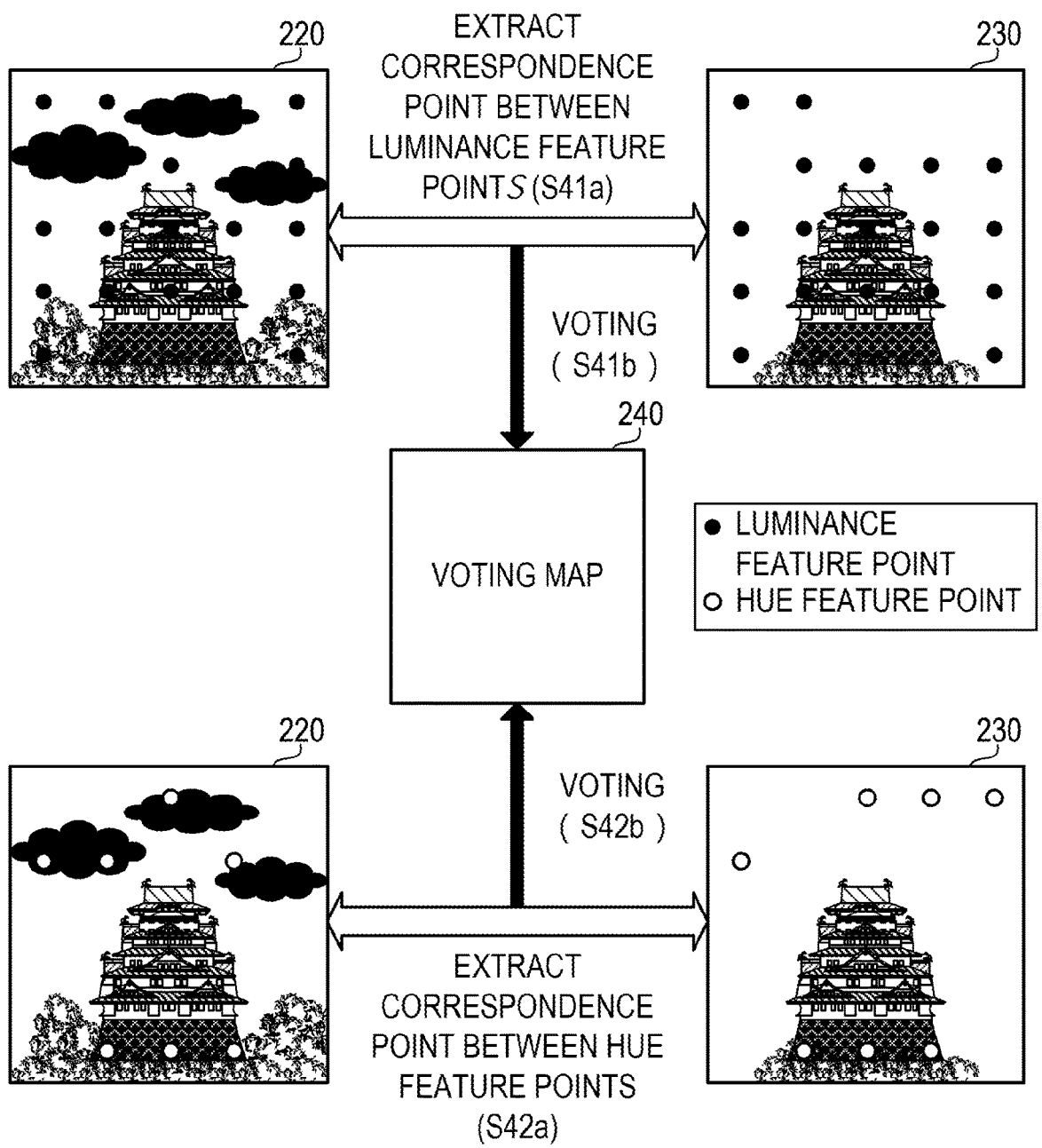
FIG. 14 is a view for explaining a correspondence point extracting process.

FIG. 14 is a view for explaining a correspondence point extracting process. The image recognition unit 126 selects a key image from the stored images in accordance with the operation input by a user. Then, the image recognition unit 126 compares the selected key image with other captured images (reference images) to search for an image similar to the key image from among the reference images.

In comparison between the key image and the reference images, similar feature points between images are searched for. In this process, the image recognition unit 126 calculates the Hamming distance between the local feature amount of the feature point selected from the key image and the local feature amount of each feature point of the reference images, and extracts a feature point having the minimal Hamming distance among the feature points of the reference images as a correspondence point with the highest similarity.

FIG. 14 exemplifies a process of extracting a correspondence point corresponding to a feature point on a key image 220 from a reference image 230. In the present embodiment, as described above, the feature points on the key image 220 and the feature points on the reference image 230 are classified as either luminance feature points or hue feature points.

Therefore, the image recognition unit 126 extracts correspondence points respectively corresponding to the luminance feature points among the feature points on the key image 220, from the luminance feature points among the feature points on the reference image 230 (S41a). In this correspondence point extraction, the luminance feature amounts calculated for the luminance feature points on the key image 220 are compared with the luminance feature amounts calculated for the luminance feature points on the reference image 230. Further, the image recognition unit 126 extracts correspondence points respectively corresponding to the hue feature points among the feature points on the key image 220, from the hue feature points among the feature points on the reference image 230 (S42a). In this correspondence point extraction, the hue feature amounts calculated for the hue feature points on the key image 220 are compared with the hue feature amounts calculated for the hue feature points on the reference image 230.

Next, the image recognition unit 126 executes the following process for each luminance feature point on the key image 220. The image recognition unit 126 estimates the center position of the key image 220 in the reference image 230 when the key image 220 is superimposed on the reference image 230 so that the luminance feature point on the key image 220 and the correspondence point on the reference image 230 match each other. The image recognition unit 126 votes for pixels at the estimated center position among the pixels of the reference image 230 (step S41b). The number of votes is managed using, for example, a voting map 240.

A similar process is executed for hue feature points on the key image 220. That is, the image recognition unit 126 executes the following process for each hue feature point on the key image 220. The image recognition unit 126 estimates the center position of the key image 220 in the reference image 230 when the key image 220 is superimposed on the reference image 230 so that the hue feature point on the key image 220 and the correspondence point on the reference image 230 match each other. The image recognition unit 126 votes for pixels at the estimated center position among the pixels of the reference image 230 (step S42b). The number of votes is managed using the common voting map 240.

Based on the result of the voting as described above, the image recognition unit 126 discriminates a pixel having the largest number of votes among the pixels of the reference image 230 and, when the number of votes of the discriminated pixel exceeds a predetermined threshold value, determines that the reference image 230 is an image similar to the key image 220.

Figure 15:
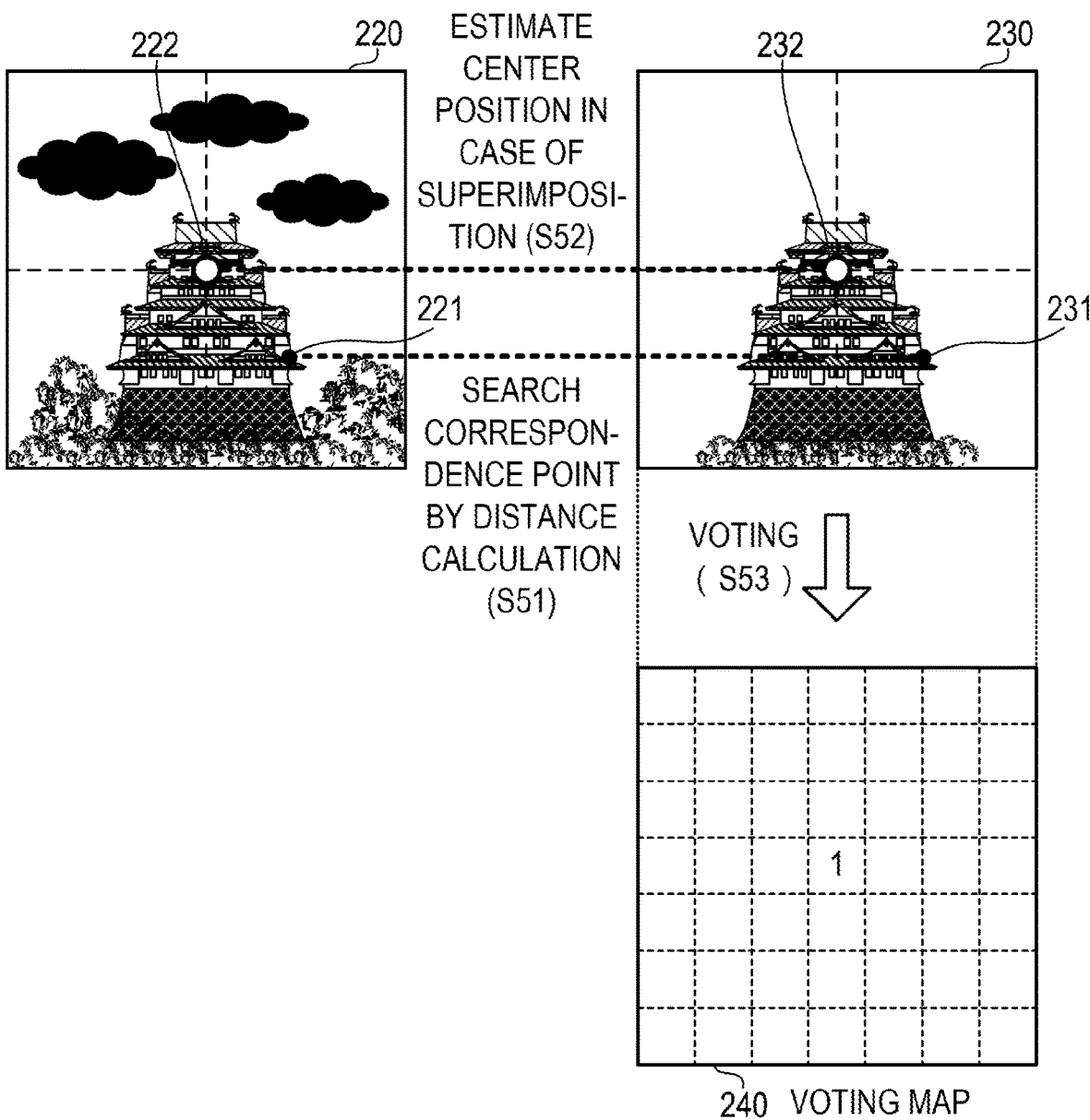
FIG. 15 is a view for explaining a voting process.

FIG. 15 is a view for explaining a voting process. FIG. 15 illustrates an example of a process of searching for a correspondence point of the reference image 230 similar to a feature point 221 of the key image 220. The feature point 221 is one of a luminance feature point and a hue feature point. For example, the image recognition unit 126 searches for a correspondence point by calculating a Hamming distance between the local feature amount of the feature point 221 of the key image 220 and the local feature amount of each feature point of the reference image 230 (step S51).

It is assumed that a feature point 231 of the reference image 230 is extracted as the correspondence point for the feature point 221 of the key image 220. At this time, the image recognition unit 126 estimates the center position 222 of the key image 220 in the reference image 230 when the key image 220 is superimposed on the reference image 230 so that the feature point 221 and the feature point 231 (correspondence point) match each other (step S52).

It is here assumed that wi and hi denote the number of pixels in the lateral width and the height of the reference image, respectively, and wr and hr denote the number of pixels in the lateral width and the height of the key image, respectively. When a feature point (xi, yi) of the reference image is searched as a correspondence point of the reference image corresponding to a feature point (xr, yr) of the key image, the position (xv, yv) of the center point of the key image in the reference image is calculated using the following equations (1) and (2).

$$xv = xi \cdot xr + (wr/2) \quad (1)$$

$$yv = yi \cdot yr + (hr/2) \quad (2)$$

Assuming that a pixel 232 is estimated as the center position of the key image 220 in the reference image 230 based on the correspondence relationship between the feature point 221 and the feature point 231 in FIG. 15, the image recognition unit 126 votes for the pixel 232 among the pixels of the reference image 230. For example, the above-mentioned voting map 240 is used for this voting process. The voting map 240 has entries corresponding to the pixels of the reference image 230. The initial value of each entry of the voting map 240 is set to 0. In the process of FIG. 15, 1 is added to an entry corresponding to the pixel 232 in the voting map 240 (step S53).

In actuality, the image recognition unit 126 may vote for each pixel included in a predetermined region centered on the pixel 232 (e.g., a rectangular region of 10 pixel square). This makes it possible to perform a robust recognizing process to some extent against a difference between the key image 220 and the reference image 230.

Figure 16:
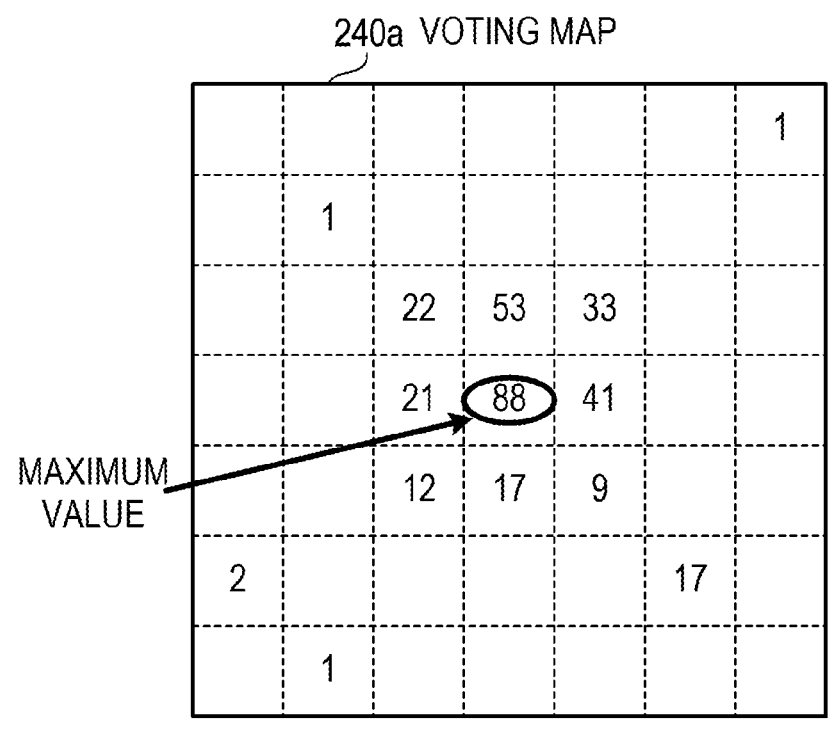
FIG. 16 is a view for explaining a similar image determining process based on a voting result.

FIG. 16 is a view for explaining a similar image determining process based on a voting result. A voting map 240a illustrated in FIG. 16 illustrates the state of the voting map 240 after the process as illustrated in FIG. 15 is executed for each feature point of the key image 220. The image recognition unit 126 extracts the maximum value out of the number of votes for each pixel in the voting map 240a and determines whether the maximum value exceeds a predetermined threshold value.

When the same object is photographed in the key image 220 and the reference image 230, the positional relationship between the feature points of the key image 220 and the correspondence points of the reference image 230 is often the same between the feature points of the key image. In this case, the number of votes is concentrated in an entry corresponding to the same pixel in the voting map 240a. In the meantime, when the relevance between the key image 220 and the reference image 230 is low, the positional relationship between the feature points of the key image 220 and the correspondence points of the reference image 230 often differs between the feature points of the key image 220. In this case, the number of votes is dispersed in the voting map 240a.

Therefore, when the maximum value of the number of votes in the voting map 240a exceeds the threshold value, since it is presumed that the number of votes is concentrated on the same pixel, it may be determined that there is a high possibility that the same object is photographed in the key image 220 and the reference image 230. Accordingly, when the maximum value of the number of votes exceeds the threshold value, the image recognition unit 126 determines that the reference image 230 is an image similar to the key image 220.

In actuality, since the maximum value of the number of votes is influenced by the number of feature points in the reference image 230, it is preferable to compare the maximum value of the number of votes with the threshold value after performing a normalizing process such as dividing the number of votes by the number of feature points in the reference image 230.

<Flowcharts>

Next, the process of the image processing apparatus 100 will be described with reference to a flowchart.

Figure 17:
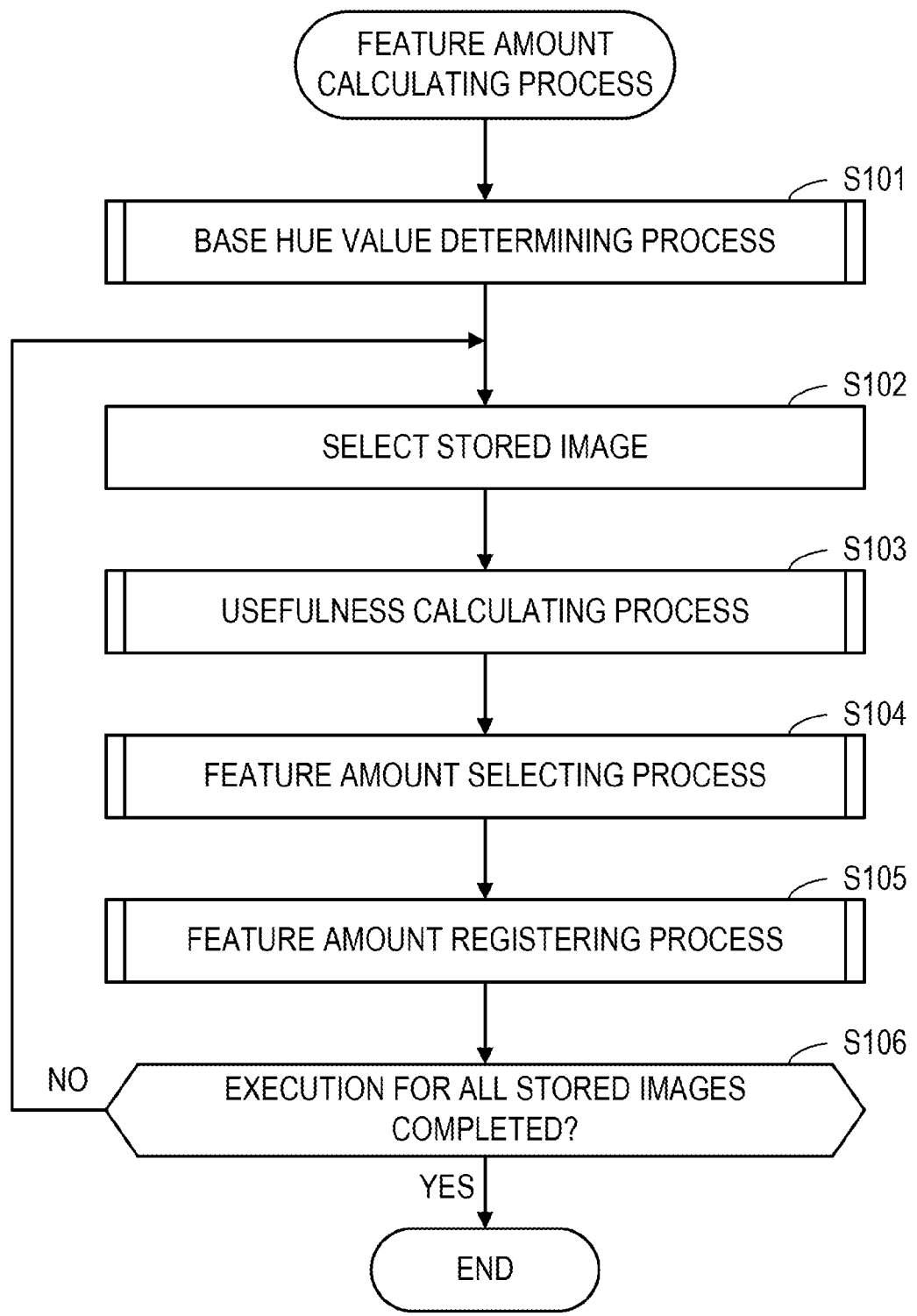
FIG. 17 is a flowchart illustrating an example of a feature amount calculating process.

FIG. 17 is a flowchart illustrating an example of a feature amount calculating process.

(Step S101) The base hue value determination unit 122 determines the base hue value Hbase based on the distribution state of the hue values in all the stored images stored in the storage unit 110.

(Step S102) The feature amount calculation unit 125 selects one stored image.

(Step S103) The usefulness calculation unit 123 calculates the usefulness of the luminance feature amount and the usefulness of the hue feature amount of each feature point on the stored image.

(Step S104) Based on the usefulness calculated in step S103, the feature amount selection unit 124 selects one of the luminance feature amount and the hue feature amount as the local feature amount corresponding to each feature point on the stored image. That is, the feature amount selection unit 124 classifies each feature point on the stored image as one of the luminance feature point and the hue feature point.

(Step S105) The feature amount calculation unit 125 calculates the luminance feature amount at the luminance feature point and registers the calculated luminance feature amount in the luminance feature amount management table 114 corresponding to the selected stored image. In addition, the feature amount calculation unit 125 calculates the hue feature amount at the hue feature point and registers the calculated hue feature amount in the hue feature amount management table 115 corresponding to the selected stored image.

(Step S106) The feature amount calculation unit 125 determines whether the steps S102 to S105 have been executed for all of the stored images stored in the storage unit 110. When there are any unexecuted stored images, the feature amount calculation unit 125 executes the step S102 to select one unexecuted stored image. In the meantime, when the steps have been executed for all the stored images, the feature amount calculation unit 125 ends the process.

Figure 18:
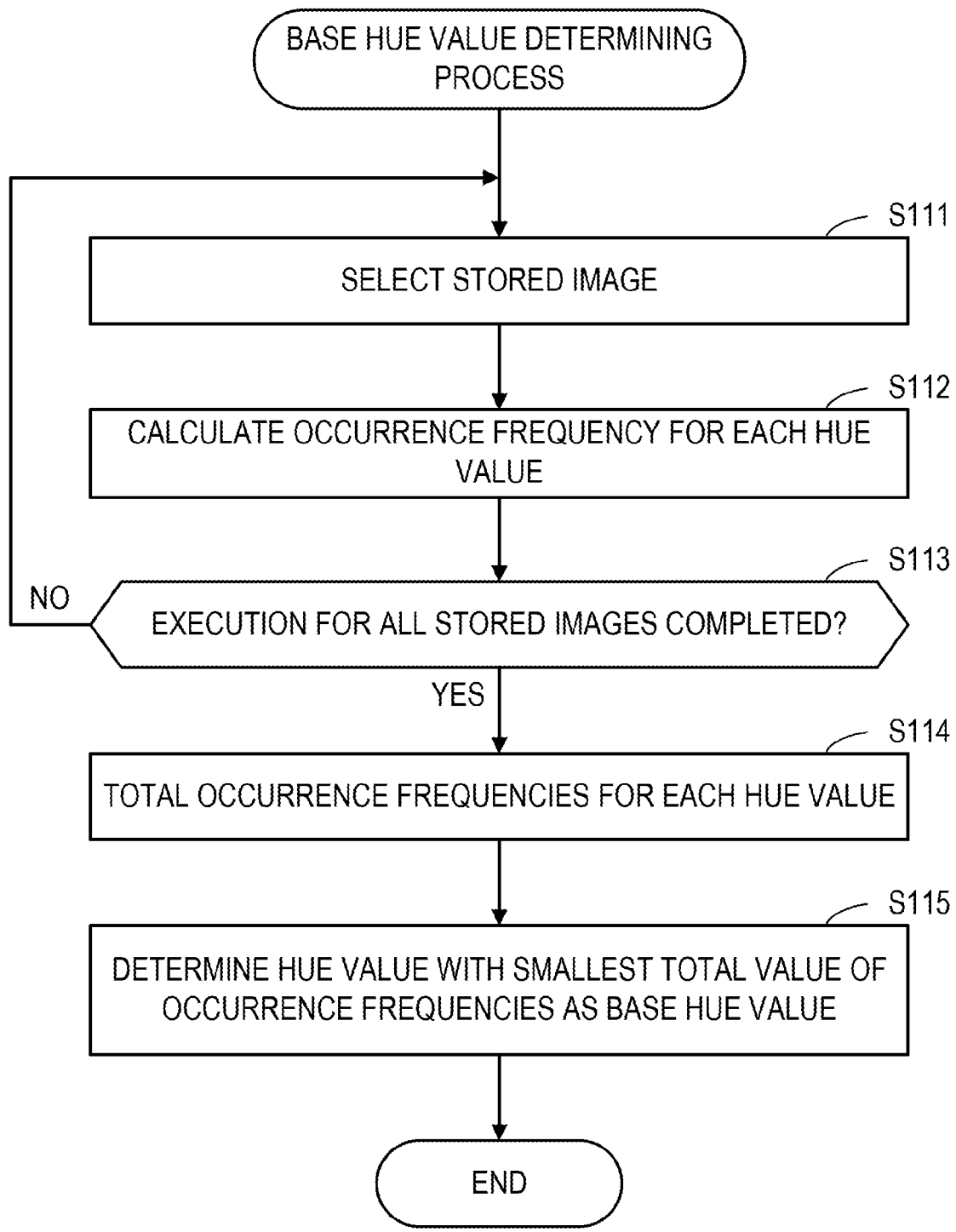
FIG. 18 is a flowchart illustrating an example of a base hue value calculating process.

FIG. 18 is a flowchart illustrating an example of a base hue value calculating process. The process of FIG. 18 corresponds to the step S101 of FIG. 17.

(Step S111) The base hue value determination unit 122 selects one stored image.

(Step S112) The base hue value determination unit 122 calculates the occurrence frequency for each hue value based on the hue value of each pixel of the stored image.

(Step S113) The base hue value determination unit 122 determines whether the steps S111 and S112 have been executed for all of the stored images stored in the storage unit 110. When there are any unexecuted stored images, the base hue value determination unit 122 executes the step S111 to select one unexecuted stored image. In the meantime, when the steps have been executed for all the stored images, the base hue value determination unit 122 executes step S114.

(Step S114) The base hue value determination unit 122 totals the occurrence frequencies calculated in the step S112 for hue values.

(Step S115) Based on the calculation result in the step S114, the base hue value determination unit 122 determines a hue value with the smallest total value of occurrence frequencies as the base hue value Hbase.

Figure 19:
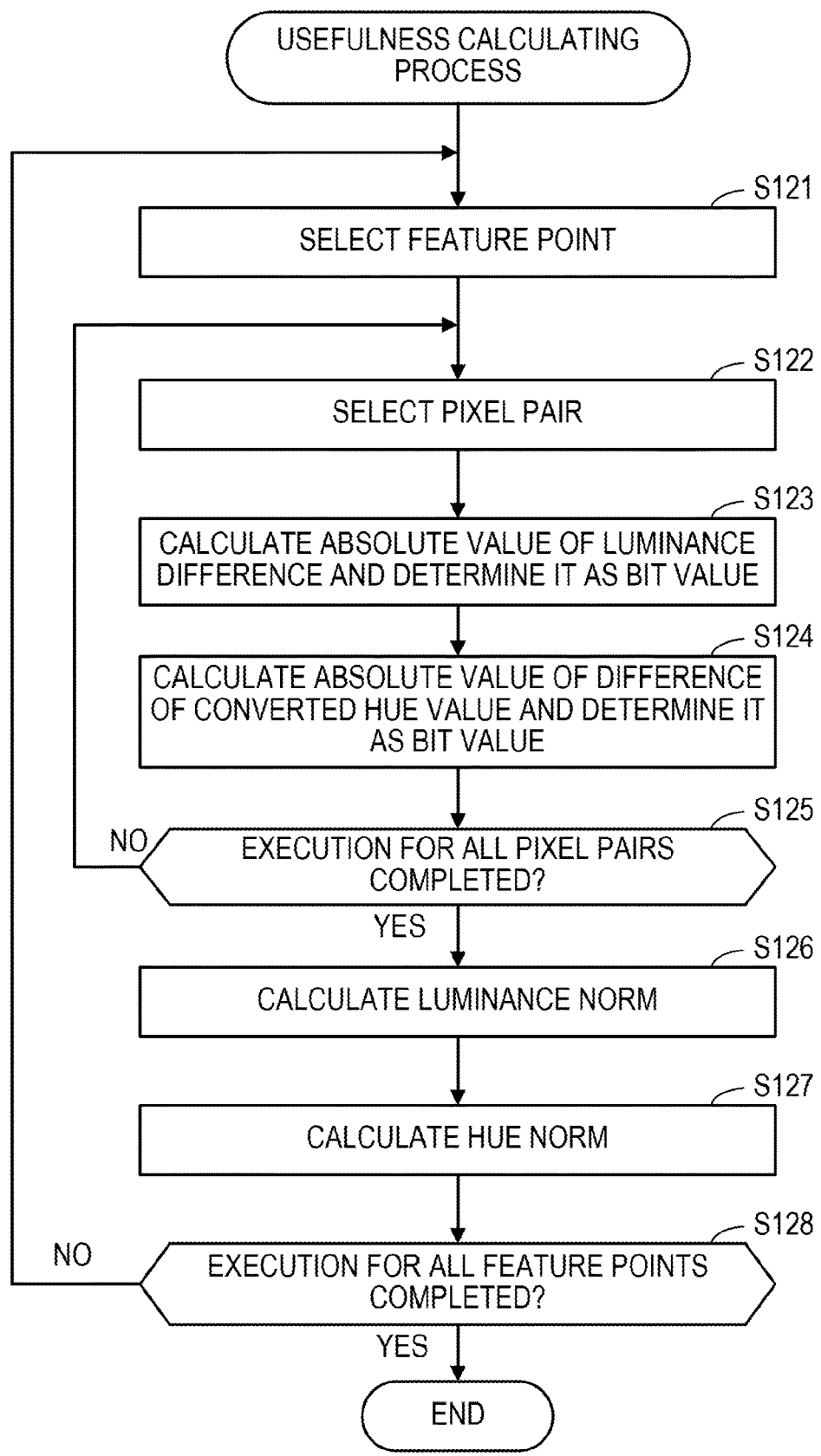
FIG. 19 is a flowchart illustrating an example of a usefulness calculating process.

FIG. 19 is a flowchart illustrating an example of a usefulness calculating process. The process of FIG. 19 corresponds to the step S103 of FIG. 17.

(Step S121) The usefulness calculation unit 123 selects one feature point from the stored image selected in the step S102.

(Step S122) The usefulness calculation unit 123 selects one pixel pair from the pixel pair management table 112.

(Step S123) The usefulness calculation unit 123 selects two pixels corresponding to the pixel pair selected in the step S122 from a feature region in a certain range centered on the feature point selected in the step S121, and calculates the absolute value of the luminance difference between the selected pixels. The luminance difference is calculated by subtracting the luminance value of the second pixel of the pixels included in the pixel pair from the luminance value of the first pixel.

The usefulness calculation unit 123 compares the calculated absolute value of the luminance difference with a predetermined threshold value larger than 0. The usefulness calculation unit 123 determines a bit value to be 1 when the absolute value of the luminance difference is equal to or larger than the threshold value, and determines the bit value to be 0 when the absolute value of the luminance difference is smaller than the threshold value. The usefulness calculation unit 123 adds the determined bit value to the lower order of a bit string indicating a luminance absolute value vector corresponding to the luminance feature point.

(Step S124) The usefulness calculation unit 123 selects two pixels corresponding to the pixel pair selected in the step S122 from a feature region in a certain range centered on the feature point selected in the step S121, and calculates the absolute value of the difference of the converted hue value between the selected pixels. The difference is calculated by subtracting the converted hue value of the second pixel of the pixels included in the pixel pair from the converted hue value of the first pixel. The converted hue value is calculated based on the base hue value Hbase determined in the step S101, as will be described in detail later with reference to FIG. 20.

The usefulness calculation unit 123 compares the calculated absolute value of the difference with a predetermined threshold value larger than zero (0). The usefulness calculation unit 123 determines a bit value to be 1 when the absolute value of the difference is equal to or larger than the threshold value, and determines the bit value to be 0 when the absolute value of the difference is smaller than the threshold value. The usefulness calculation unit 123 adds the determined bit value to the lower order of a bit string indicating a hue absolute value vector corresponding to the hue feature point.

(Step S125) The usefulness calculation unit 123 determines whether the steps S122 to S124 have been executed for all pixel pairs registered in the pixel pair management table 112. When there is an unexecuted pixel pair, the usefulness calculation unit 123 executes the step S122 to select the unexecuted pixel pair.

In the meantime, when the steps have been executed for all the pixel pairs, the usefulness calculation unit 123 specifies a record corresponding to the feature point selected in the step S121 from the intermediate data management table 113. The usefulness calculation unit 123 registers in the specified record the luminance absolute value vector generated in the step S123 and the hue absolute value vector generated in the step S124. Then, the usefulness calculation unit 123 executes the step S126.

(Step S126) The usefulness calculation unit 123 calculates the norm of the luminance absolute value vector as a luminance norm and registers the calculated norm of the luminance absolute value vector in the record specified in the step S125.

(Step S127) The usefulness calculation unit 123 calculates the norm of the hue absolute value vector as a hue norm and registers the calculated norm of the hue absolute value vector in the record specified in the step S125.

(Step S128) The usefulness calculation unit 123 determines whether the steps S121 to S127 have been executed for all the feature points. When there is an unexecuted feature point, the usefulness calculation unit 123 executes the step S121 to select the unexecuted feature point. In the meantime, when the steps have been executed for all the feature points, the usefulness calculation unit 123 ends the process.

According to the above process of FIG. 19, the luminance norm indicating the usefulness of the luminance feature amount and the hue norm indicating the usefulness of the hue feature amount for all the feature points are registered in the intermediate data management table 113 corresponding to the stored image.

Figure 20:
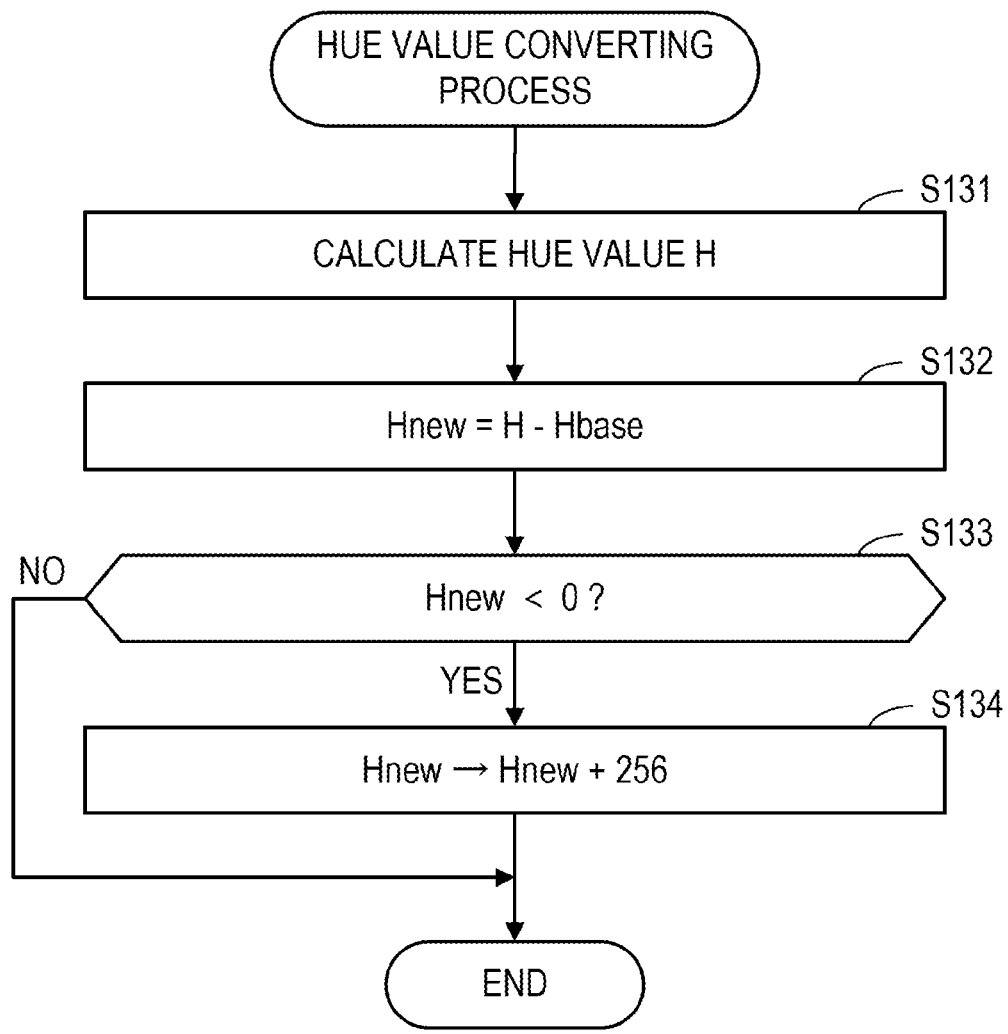
FIG. 20 is a flowchart illustrating an example of a hue value converting process.

FIG. 20 is a flowchart illustrating an example of a hue value converting process. The process of FIG. 20 is a process of converting the original hue value H into a converted hue value Hnew for each pixel of the stored image based on the base hue value Hbase, and is executed in the step S124 of FIG. 19 and a step S158 of FIG. 22 (to be described later). The process of FIG. 20 is executed by the usefulness calculation unit 123 in the step S124 and is executed by the feature amount calculation unit 125 in the step S158.

(Step S131) The hue value H is calculated based on a pixel value.

(Step S132) The converted hue value Hnew is calculated by subtracting the base hue value Hbase from the hue value H.

(Step S133) It is determined whether the converted hue value Hnew calculated in the step S132 is smaller than 0. When the converted hue value Hnew is equal to or larger than 0, the converted hue value Hnew corresponding to the pixel is determined and the process ends. In the meantime, when the converted hue value Hnew is smaller than 0, the following step S134 is executed.

(Step S134) 256 is added to the converted hue value Hnew calculated in the step S132 and a value obtained by the addition is determined as the converted hue value Hnew.

Figure 21:
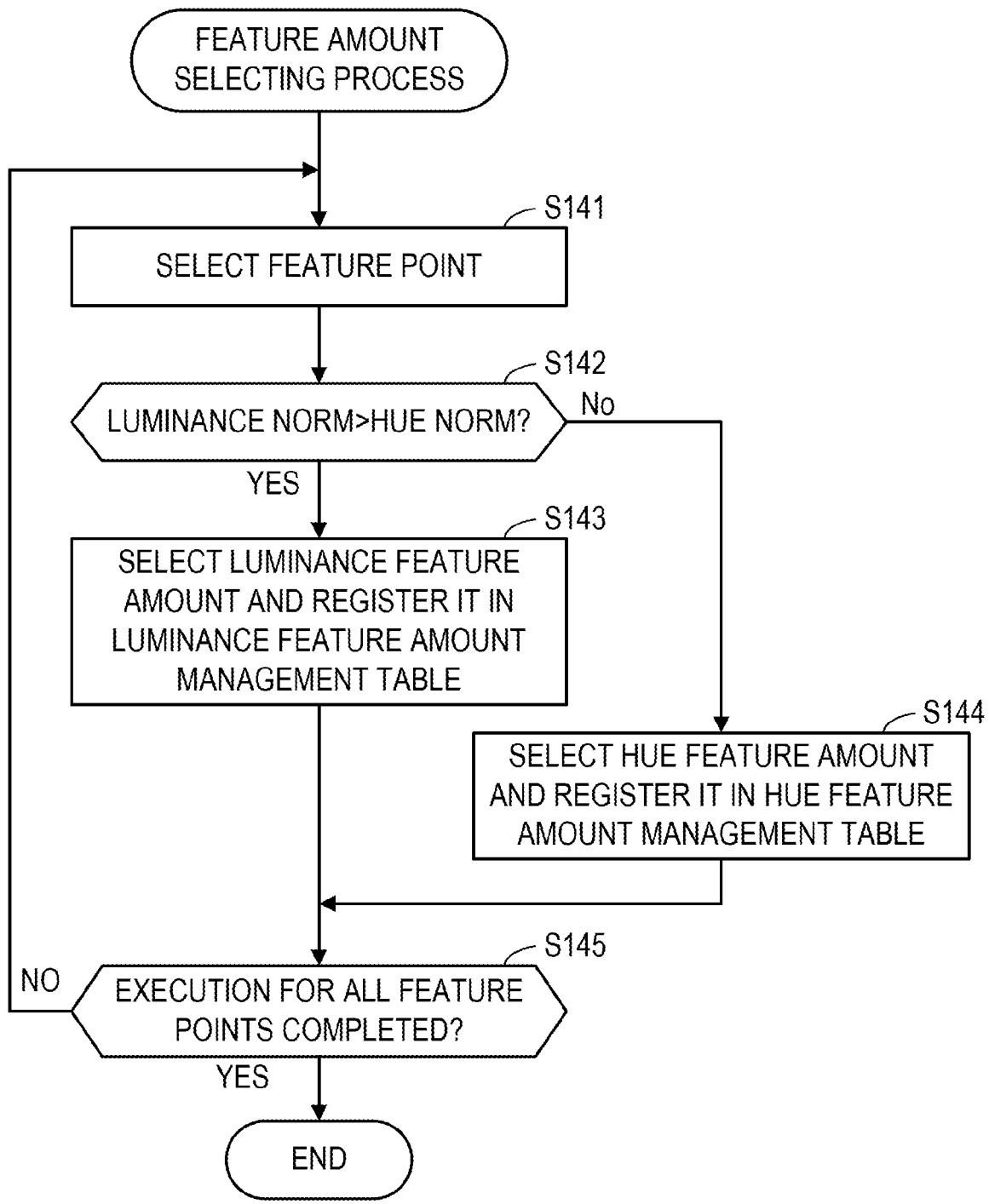
FIG. 21 is a flowchart illustrating an example of a feature amount selecting process.

FIG. 21 is a flowchart illustrating an example of a feature amount selecting process. The process of FIG. 21 corresponds to the step S104 of FIG. 17.

(Step S141) The feature amount selection unit 124 selects one feature point from the stored image selected in the step S102. In the actual process, the feature amount selection unit 124 selects one record from the intermediate data management table 113 generated by the process of FIG. 19.

(Step S142) The feature amount selection unit 124 reads the luminance norm and the hue norm from the record selected in the step S141 and determines whether the luminance norm is larger than the hue norm. The feature amount selection unit 124 executes the following step S143 when the luminance norm is larger than the hue norm, and executes the following step S144 when the luminance norm is equal to or smaller than the hue norm.

(Step S143) The feature amount selection unit 124 selects the luminance feature amount as the local feature amount corresponding to the feature point selected in the step S141. At this time, the feature amount selection unit 124 adds one record to the luminance feature amount management table 114 corresponding to the stored image selected in the step S102. The feature amount selection unit 124 registers an ID indicating the feature point selected in the step S141 and the coordinate of the feature point in the added record.

(Step S144) The feature amount selection unit 124 selects the hue feature amount as the local feature amount corresponding to the feature point selected in the step S141. At this time, the feature amount selection unit 124 adds one record to the hue feature amount management table 115 corresponding to the stored image selected in the step S102. The feature amount selection unit 124 registers an ID indicating the feature point selected in the step S141 and the coordinates of the feature point in the added record.

(Step S145) The feature amount selection unit 124 determines whether the steps S141 to S144 have been executed for all the feature points. When there is an unexecuted feature point, the feature amount selection unit 124 executes the step S141 to select the unexecuted feature point. In the meantime, when the steps have been executed for all the feature points, the feature amount selection unit 124 ends the process.

According to the above process of FIG. 21, all the feature points in the stored image are classified as one of the luminance feature point and the hue feature point based on the comparison of usefulness. In the step S143, the coordinate of the feature point classified as the luminance feature point is registered in the luminance feature amount management table 114. In the step S144, the coordinate of the feature point classified as the hue feature point is registered in the hue feature amount management table 115. Then, according to a process of FIG. 22 to be described below, the local feature amount corresponding to each of the luminance feature point and the hue feature point is calculated and registered in one of the luminance feature amount management table 114 and the hue feature amount management table 115.

Figure 22:
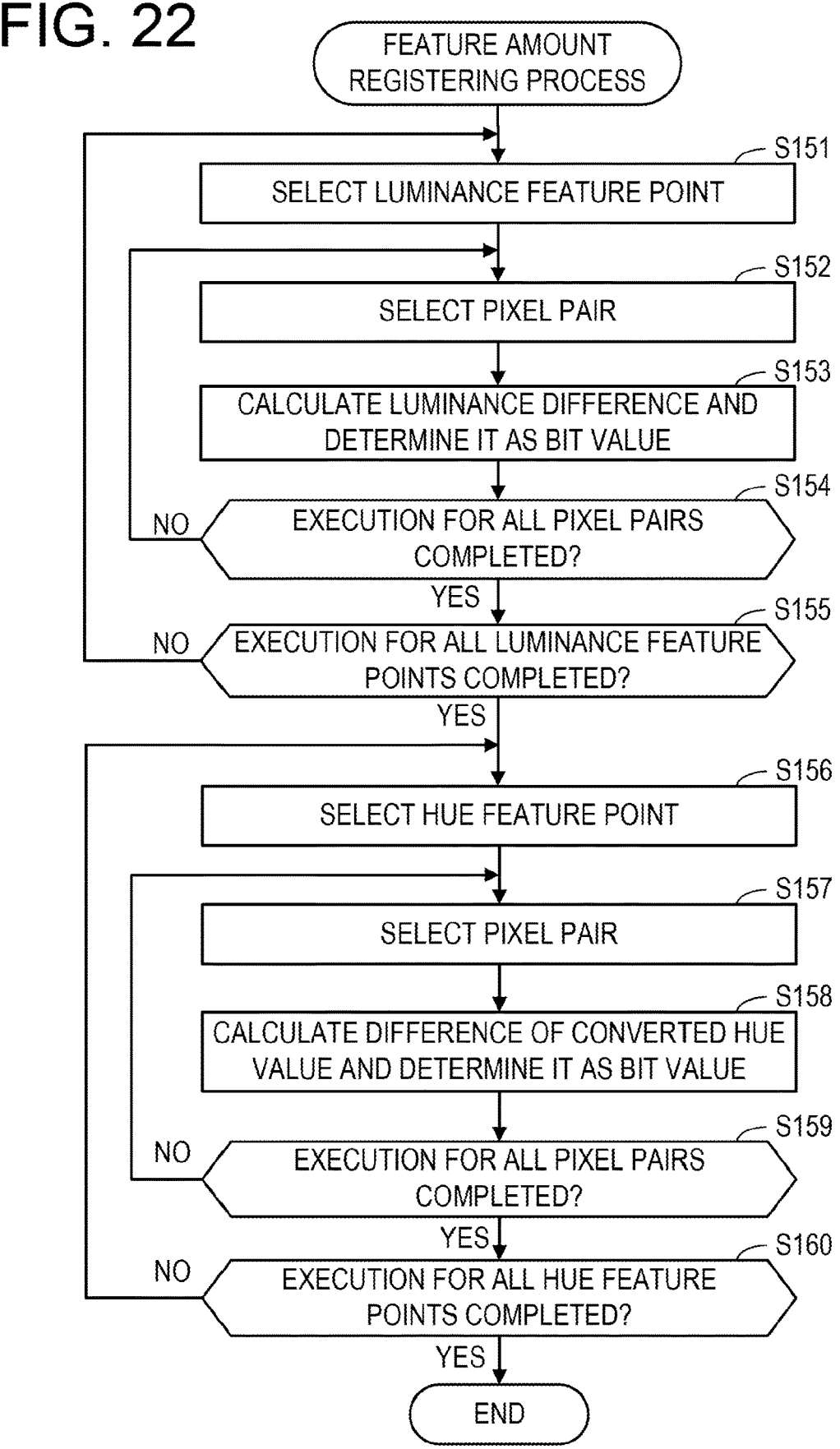
FIG. 22 is a flowchart illustrating an example of a feature amount registering process.

FIG. 22 is a flowchart illustrating an example of a feature amount registering process. The process of FIG. 22 corresponds to the step S105 of FIG. 17.

(Step S151) The feature amount calculation unit 125 selects one luminance feature point from the stored image selected in the step S102. In the actual process, the feature amount calculation unit 125 selects one record from the luminance feature amount management table 114 corresponding to the stored image selected in the step S102.

(Step S152) The feature amount calculation unit 125 selects one pixel pair from the pixel pair management table 112.

(Step S153) The feature amount calculation unit 125 selects two pixels corresponding to the pixel pair selected in the step S152 from a feature region in a certain range centered on the luminance feature point selected in the step S151, and calculates the luminance difference between the selected pixels. The luminance difference is calculated by subtracting the luminance value of the second pixel of the pixels included in the pixel pair from the luminance value of the first pixel.

The feature amount calculation unit 125 determines a bit value to be 1 when the calculated luminance difference is larger than 0, and determines the bit value to be 0 when the calculated luminance difference is equal to or smaller than 0. The feature amount calculation unit 125 adds the determined bit value to the lower order of a bit string indicating the luminance feature amount corresponding to the luminance feature point.

(Step S154) The feature amount calculation unit 125 determines whether the steps S152 and S153 have been executed for all pixel pairs registered in the pixel pair management table 112. When there is an unexecuted pixel pair, the feature amount calculation unit 125 executes the step S152 to select the unexecuted pixel pair.

In the meantime, when the steps have been executed for all the pixel pairs, the generation of bit string in the step S153 has been completed. In this case, the feature amount calculation unit 125 registers the generated bit string as the luminance feature amount in the record selected from the luminance feature amount management table 114 in the step S151.

(Step S155) The feature amount calculation unit 125 determines whether the steps S151 to S154 have been performed for all the luminance feature points. When there is an unexecuted luminance feature point, the feature amount calculation unit 125 executes the step S151 to select then unexecuted luminance feature point. In the meantime, when the steps have been executed for all the luminance feature points, the feature amount calculation unit 125 executes the following step S156.

(Step S156) The feature amount calculation unit 125 selects one hue feature point from the stored image selected in the step S102. In the actual process, the feature amount calculation unit 125 selects one record from the hue feature amount management table 115 corresponding to the stored image selected in the step S102.

(Step S157) The feature amount calculation unit 125 selects one pixel pair from the pixel pair management table 112.

(Step S158) The feature amount calculation unit 125 selects two pixels corresponding to the pixel pair selected in the step S157 from a feature region in a certain range centered on the hue feature point selected in the step S156, and calculates a difference of the converted hue value between the selected pixels. This difference is calculated by subtracting the converted hue value of the second pixel of the pixels included in the pixel pair from the converted hue value of the first pixel.

The feature amount calculation unit 125 determines a bit value to be 1 when the calculated difference is larger than 0, and determines the bit value to be 0 when the calculated difference is equal to smaller than 0. The feature amount calculation unit 125 adds the determined bit value to the lower order of a bit string indicating the hue feature amount corresponding to the hue feature point.

(Step S159) The feature amount calculation unit 125 determines whether the steps S157 and S158 have been executed for all pixel pairs registered in the pixel pair management table 112. When there is an unexecuted pixel pair, the feature amount calculation unit 125 executes the step S157 to select the unexecuted pixel pair.

In the meantime, when the steps have been executed for all the pixel pairs, the generation of bit string in the step S158 has been completed. In this case, the feature amount calculation unit 125 registers the generated bit string as the hue feature amount in the record selected from the hue feature amount management table 115 in the step S156.

(Step S160) The feature amount calculation unit 125 determines whether the steps S156 to S159 have been executed for all the hue feature points. When there is an unexecuted hue feature point, the feature amount calculation unit 125 executes the step S156 to select the unexecuted hue feature point. In the meantime, when the steps have been executed for all the hue feature points, the feature amount calculation unit 125 ends the process.

Through the above process of FIG. 22, one of the luminance feature amount and the hue feature amount is calculated for all the feature points in the stored image and is registered in the storage unit 110. In particular, in the present embodiment, the hue feature amount is calculated not using the original hue value but using the converted hue value Hnew converted based on the base hue value Hbase.

Figure 23:
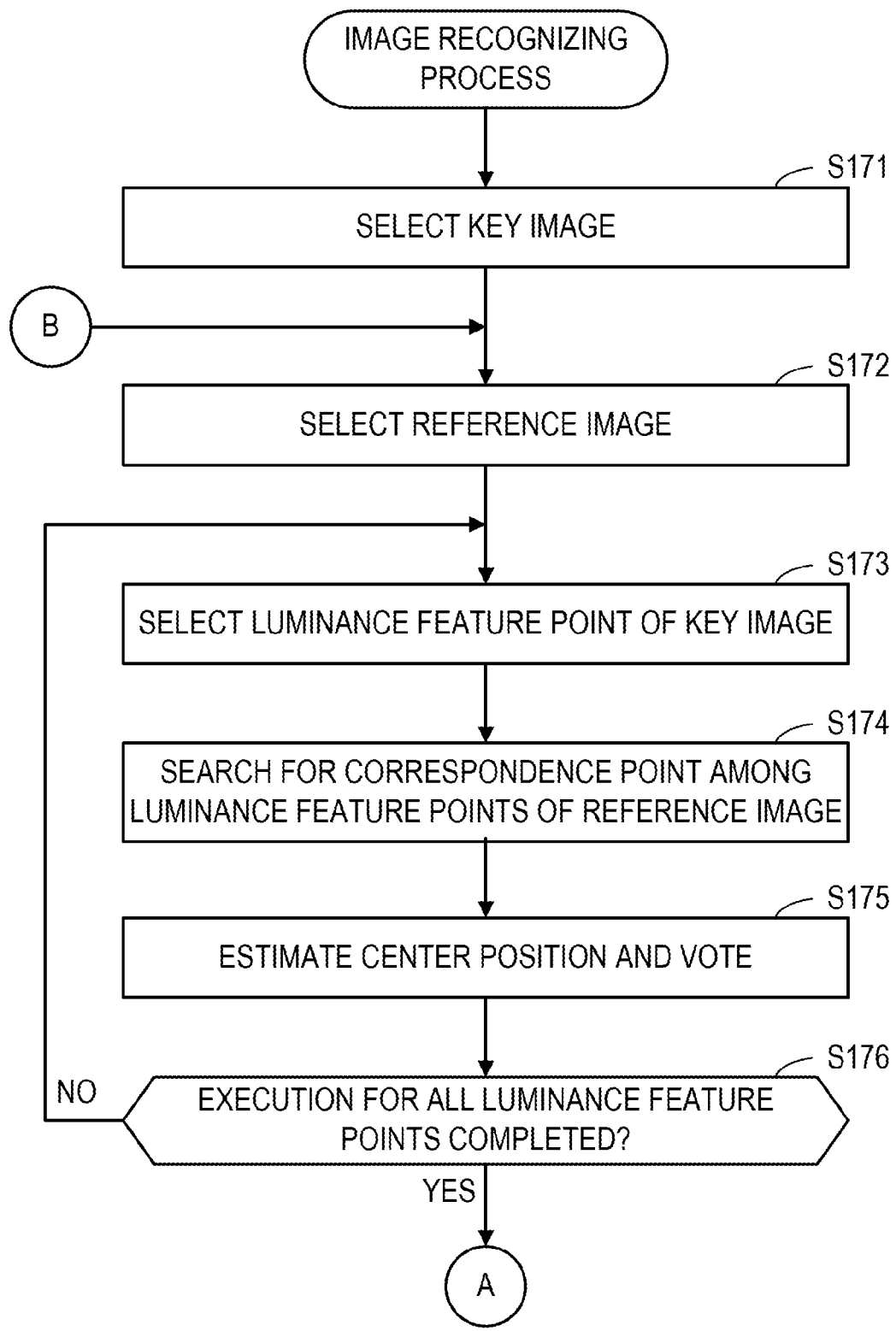
FIG. 23 is a flowchart (part 1) illustrating an example of an image recognizing process.
Figure 24:
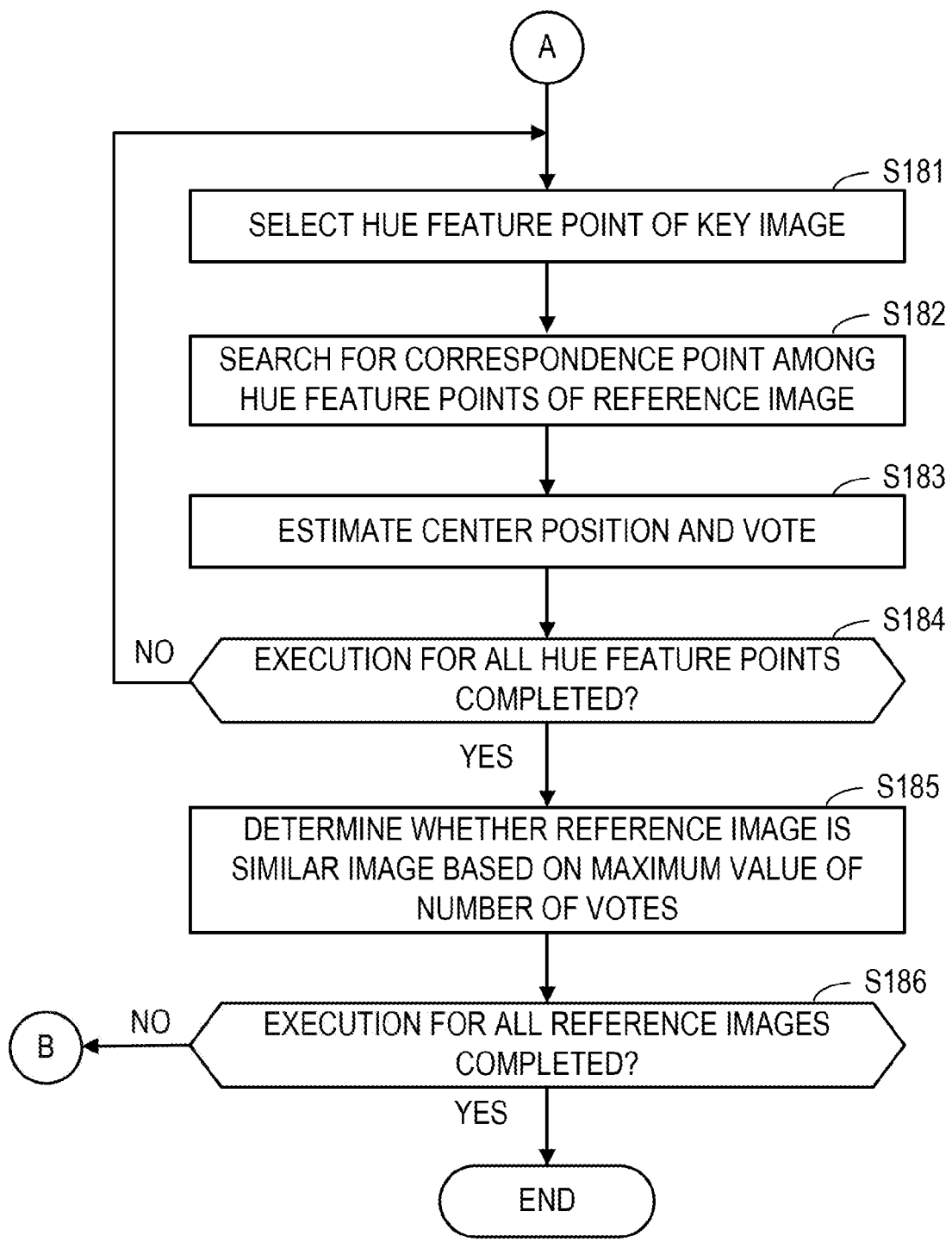
FIG. 24 is a flowchart (part 2) illustrating an example of an image recognizing process.

FIGS. 23 and 24 are flowcharts illustrating an example of an image recognizing process.

(Step S171) The image recognition unit 126 selects a key image from a stored image in accordance with the operation input by the user.

(Step S172) The image recognition unit 126 selects one stored image (reference image) other than the key image.

(Step S173) The image recognition unit 126 selects one luminance feature point of the key image based on the luminance feature amount management table 114 of the key image.

(Step S174) The image recognition unit 126 searches for a feature point (correspondence point) similar to the luminance feature point selected from the key image in the step S173 among the luminance feature points in the reference image selected in the step S172. In this process, the image recognition unit 126 refers to the luminance feature amount management table 114 corresponding to the key image and the luminance feature amount management table 114 corresponding to the reference image. The image recognition unit 126 calculates a Hamming distance between the luminance feature amount corresponding to the luminance feature point selected from the key image and the luminance feature amount corresponding to each luminance feature point of the reference image, and extracts a feature point having the minimal Hamming distance among the luminance feature points of the reference image as a correspondence point with the highest similarity.

(Step S175) The image recognition unit 126 estimates the center position of the key image in the reference image when the key image is superimposed on the reference image so that the luminance feature point selected in the step S173 and the correspondence point searched in the step S174 match each other. The image recognition unit 126 votes for pixels at the estimated center position among the pixels of the reference image. In actuality, the image recognition unit 126 may vote for each pixel included in a predetermined region centered on the estimated center position (e.g., a rectangular region of 10 pixel square).

(Step S176) The image recognition unit 126 determines whether the steps S173 to S175 have been executed for all the luminance feature points in the key image. When there is an unexecuted luminance feature point, the image recognition unit 126 executes the step S173 to select the unexecuted luminance feature point. In the meantime, when the steps have been executed for all the luminance feature points, the image recognition unit 126 executes the following step S181 of FIG. 24.

The description will be continued below with reference to FIG. 24.

(Step S181) The image recognition unit 126 selects one hue feature point of the key image based on the hue feature amount management table 115 of the key image.

(Step S182) The image recognition unit 126 searches for a feature point (correspondence point) similar to the hue feature point selected from the key image in the step S181 among the hue feature points in the reference image selected in the step S172. In this process, the image recognition unit 126 refers to the hue feature amount management table 115 corresponding to the key image and the hue feature amount management table 115 corresponding to the reference image. The image recognition unit 126 calculates a Hamming distance between the hue feature amount corresponding to the hue feature point selected from the key image and the hue feature amount corresponding to each hue feature point of the reference image, and extracts a feature point having the minimal Hamming distance among the hue feature points of the reference image as a correspondence point with the highest similarity.

(Step S183) The image recognition unit 126 estimates the center position of the key image in the reference image when the key image is superimposed on the reference image so that the hue feature point selected in the step S181 and the correspondence point searched in the step S182 match each other. The image recognition unit 126 votes for pixels at the estimated center position among the pixels of the reference image. In actuality, the image recognition unit 126 may vote for each pixel included in a predetermined region centered on the estimated center position (e.g., a rectangular region of 10 pixel square).

(Step S184) The image recognition unit 126 determines whether the steps S181 to S183 have been executed for all the hue feature points in the key image. When there is an unexecuted hue feature point, the image recognition unit 126 executes the step S1813 to select the unexecuted hue feature point. In the meantime, when the steps have been executed for all the hue feature points, the image recognition unit 126 executes the following step S185.

(Step S185) When the maximum value of the number of votes for each pixel of the reference image selected in the step S172 exceeds a predetermined threshold value, the image recognition unit 126 determines the reference image to be an image similar to the key image. In this case, for example, the image recognition unit 126 outputs the identification information of the reference image determined to be similar to the key image. In the meantime, when the maximum value of the number of votes is equal to or smaller than the threshold value, the image recognition unit 126 determines that the reference image is not similar to the key image.

In the step S185, for example, the image recognition unit 126 may output the identification information of all the reference images having the maximum value of the number of votes exceeding the predetermined threshold in order of magnitude of the number of votes. In this case, the number of votes indicates the similarity between the key image and the reference images.

(Step S186) The image recognition unit 126 determines whether the steps S172 to S176 and S181 to S185 have been executed for all the reference images. When there is an unexecuted reference image, the image recognition unit 126 executes the step S172 to select one reference image. In the meantime, when the steps have been executed for all the reference images, the image recognition unit 126 ends the process.

According to the image processing apparatus 100 described above, each feature point in a stored image is classified as one of a luminance feature point where the luminance feature amount is used to provide the higher stability of the local feature amount and a hue feature point where the hue feature amount is used to provide the higher stability of the local feature amount. As a result, even when the luminance difference between pixels in a feature region corresponding to the feature point is small, when the hue difference between pixels is large, it is possible to calculate a stable local feature amount against illumination conditions and noise.

Further, the hue feature amount is calculated based on the converted hue value Hnew. As a result, even when many pixels of a specific hue (e.g., red) occur in an image to be searched, it is possible to calculate a stable hue feature amount against illumination conditions and noise.

When similarity determination is made between the key image selected from the stored image and the reference image, a correspondence point corresponding to each luminance feature point in the key image among the luminance feature points in the reference image is extracted. In addition to this, a correspondence point corresponding to each hue feature point in the key image among the hue feature points in the reference image is extracted. The luminance feature amount is used to extract the correspondence point of the luminance feature point, and the hue feature amount is used to extract the correspondence point of the hue feature point.

As described above, since the stable local feature amount has been calculated as the local feature amounts in the key image and the reference image, the extraction accuracy of the correspondence point is improved. As a result, it is possible to improve the accuracy of similarity determination between images.

In addition, among the luminance feature amount and the hue feature amount, a feature amount having high usefulness is selectively calculated as the local feature amount of each feature point. Therefore, as compared with a case of using both the luminance feature amount and the hue feature amount as the local feature amount, it is possible to reduce the computational load of the local feature amount and shorten the processing time.

Third Embodiment

Figure 25:
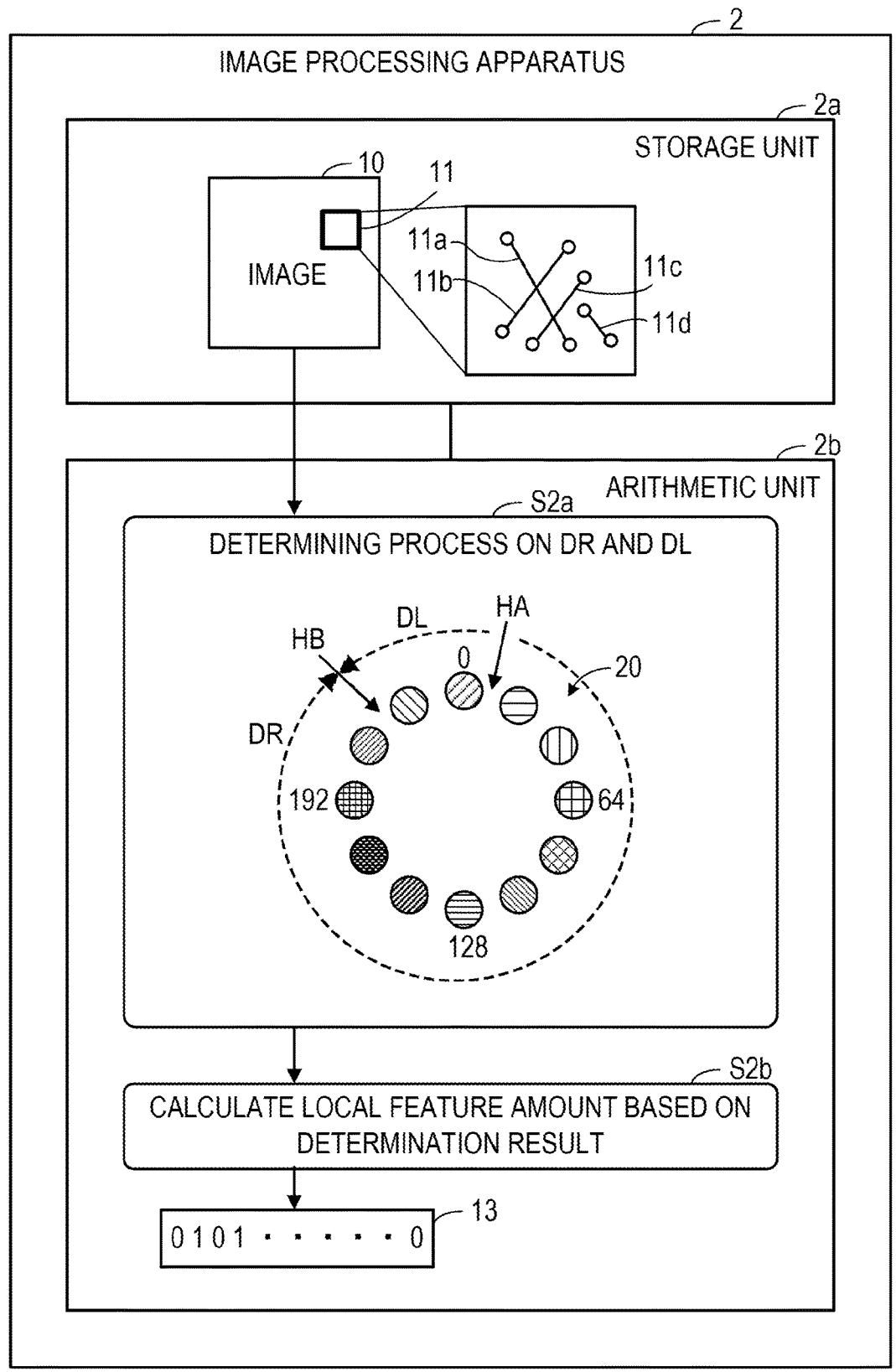
FIG. 25 is a view illustrating a configuration example and a processing example of an image processing apparatus according to a third embodiment.

FIG. 25 is a view illustrating a configuration example and a processing example of an image processing apparatus according to a third embodiment. The image processing apparatus 2 illustrated in FIG. 25 includes a storage unit 2a and an arithmetic unit 2b. The storage unit 2a is implemented with a storage device such as a RAM or an HDD. The arithmetic unit 2b is implemented with, for example, a processor.

The storage unit 2a stores an image 10 which is a feature amount calculation target. As in the first embodiment, a feature region 11 is set in the image 10 and pixel pairs 11a to 11d are set in the feature region 11.

The arithmetic unit 2b calculates the feature amount of the image 10 according to the following process based on the hue of each pixel of the image 10 stored in the storage unit 2a.

First, the arithmetic unit 2b executes the following determining process for each of the pixel pairs 11a to 11d in the feature region 11 (step S2a). It is here assumed that the hue value of one pixel included in the pixel pair is HA and the hue value of the other pixel is HB. The arithmetic unit 2b determines which of a distance DR in the clockwise direction in a hue circle 20 between the hue value HA and the hue value HB and a distance DL in the counterclockwise direction in the color circle 20 between the hue value HA and the hue value HB is shorter.

Next, the arithmetic unit 2b determines a bit value corresponding to each of the pixel pairs 11a to 11d based on the determination result in the step S2a, and arranges the bit value to calculate a local feature amount 13 for the feature region 11 (step S2b).

According to the determining process of the step S2a, the proximity in the hue circle 20 between the hue of one pixel included in the pixel pair and the hue of the other pixel is accurately determined. Therefore, by determining a bit value based on the result of such a determining process, even when a specific hue (e.g., red) is included in the feature region 11, the bit value is hardly inverted due to the influence of photographing conditions and noise.

For example, in FIG. 25, the hue value HA is a value close to the minimum value "0". In such a case, when the photographing conditions or the noise occurrence situation changes, the hue value HA may fluctuate beyond a boundary on the hue circle 20 to a value close to the maximum value "255". Therefore, when the bit value is determined based on the sign of a difference between the hue value HA and the hue value HB, the bit value is likely to be inverted. In the meantime, by determining the bit value based on the result of determination as to which of the distances DR and DL is shorter, the bit value is unlikely to be inverted due to the influence of the photographing conditions or noise.

In this way, with the image processing apparatus 2 according to the third embodiment, it is difficult for a bit value to be inverted in a feature region including a specific hue and, as a result, the value of the local feature amount 13 is stabilized. That is, a feature amount with high robustness may be calculated.

In addition, according to the above-described procedure, the local feature amount is calculated from each of two images to be compared and the similarity between the images is determined based on comparison between the local feature amounts of the images, thereby improving the accuracy of determination.

Fourth Embodiment

Next, an image processing apparatus according to a fourth embodiment will be described. The image processing apparatus according to the fourth embodiment is an example of an apparatus having the processing function of the image processing apparatus 2 according to the third embodiment and is implemented by modifying a portion of the processing function of the image processing apparatus 100 according to the second embodiment as follows. Therefore, in the following description, differences from the image processing apparatus 100 according to the second embodiment will be mainly described and explanation of other portions will be omitted as appropriate.

Figure 26:
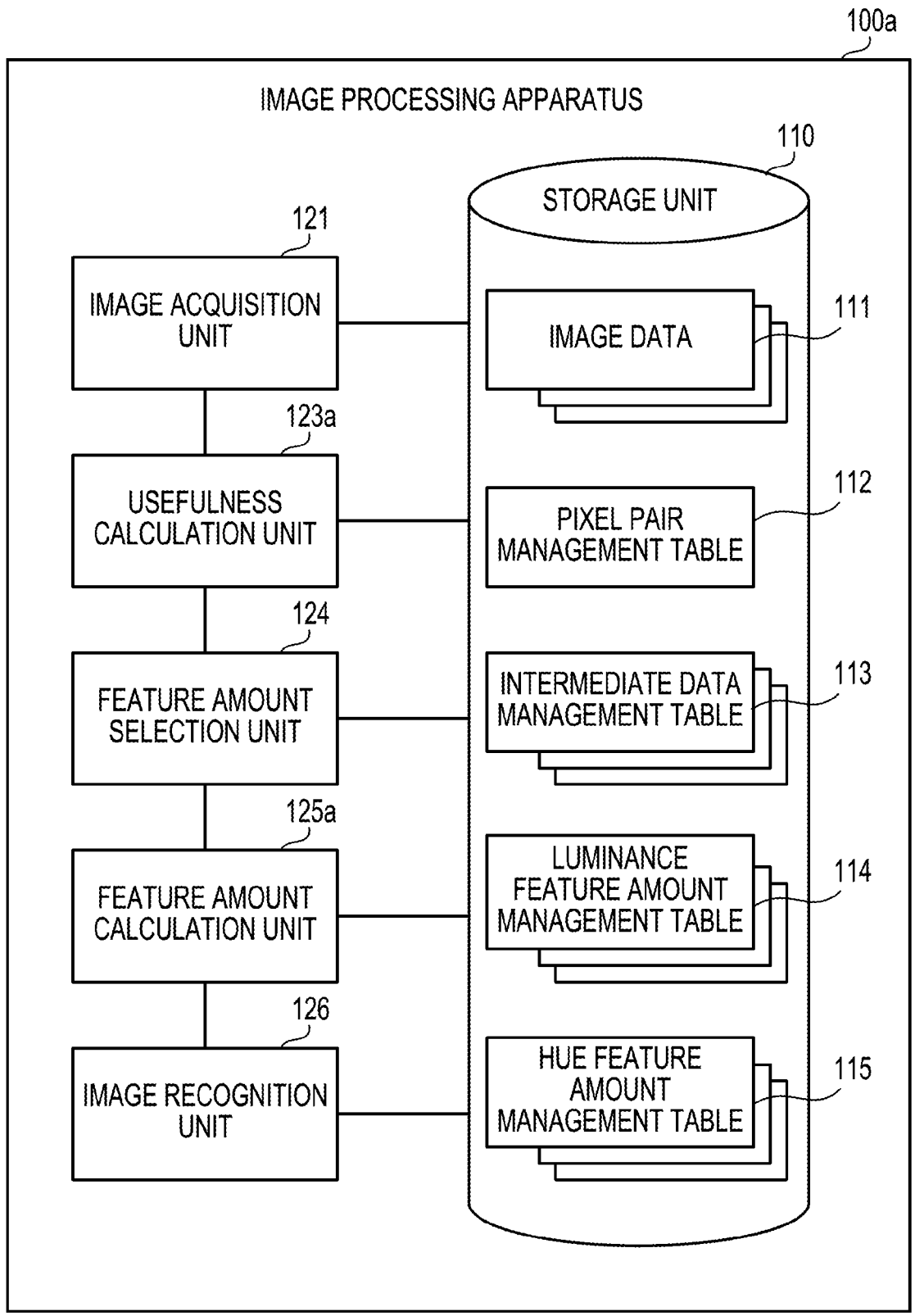
FIG. 26 is a block diagram illustrating a configuration example of a processing function of an image processing apparatus according to a fourth embodiment.

FIG. 26 is a block diagram illustrating a configuration example of the processing function of the image processing apparatus according to the fourth embodiment. The image processing apparatus 100a illustrated in FIG. 26 includes a storage unit 110, an image acquisition unit 121, a feature amount selection unit 124, and an image recognition unit 126, which are similar to those of the image processing apparatus 100 illustrated in FIG. 3. In addition, the image processing apparatus 100a includes a usefulness calculation unit 123a and a feature amount calculation unit 125a instead of the usefulness calculation unit 123 and the feature amount calculation unit 125 illustrated in FIG. 3. The image processing apparatus 100a does not include the base hue value determination unit 122 illustrated in FIG. 3.

The usefulness calculation unit 123a is different from the usefulness calculation unit 123 in FIG. 3 in that the former uses the original hue value before conversion, instead of a converted hue value, to calculate the usefulness. The feature amount calculation unit 125a is different from the feature amount calculation unit 125 in FIG. 3 in that the former determines the bit value of a hue feature amount depending on which of the clockwise direction distance and the counterclockwise direction distance in the hue circle 320 of each hue value of the pixel pair is shorter.

The storage unit 110 is an example of the storage unit 2a illustrated in FIG. 25 and the usefulness calculation unit 123a, the feature amount selection unit 124, and the feature amount calculation unit 125a are examples of the arithmetic unit 2b illustrated in FIG. 25. As in the image processing apparatus 100, a portion of the processing function of the image processing apparatus 100a may be provided in an external apparatus separated from the image processing apparatus 100a.

Figure 27A:
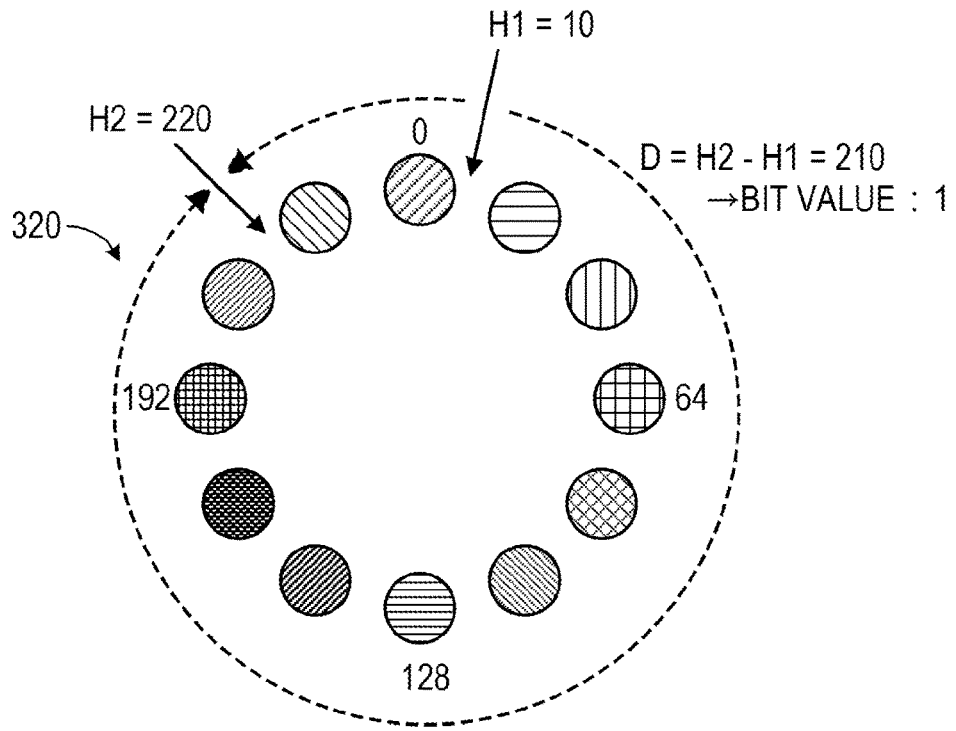
FIGS. 27A and 27B are views for explaining a method of determining a hue feature amount bit value.
Figure 27B:
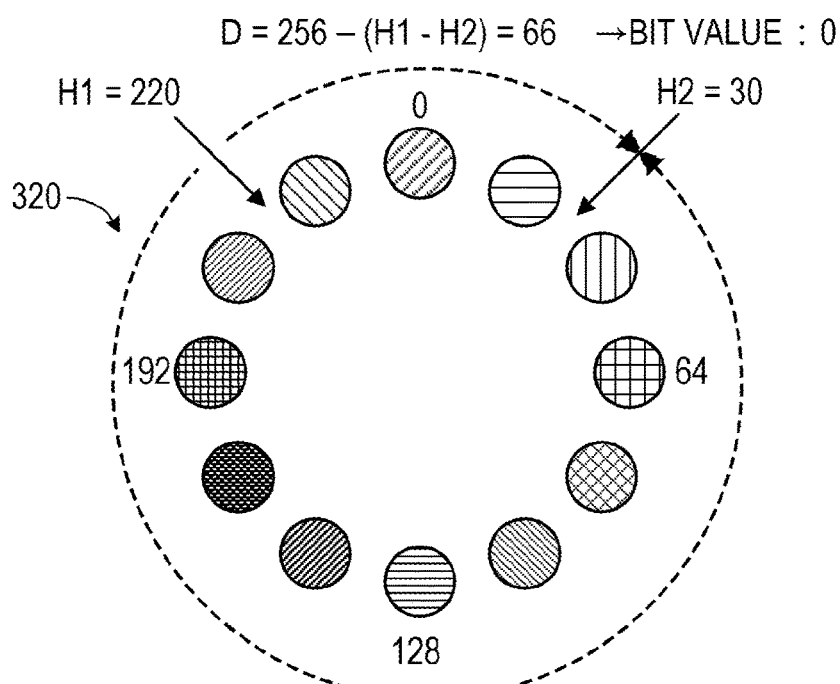

FIGS. 27A and 27B are views for explaining a method of determining a hue feature amount bit value. As described above, in the method of determining the hue feature amount bit value based on the sign of the hue difference, the hue feature amount bit value for a specific hue may easily be reversed due to the difference in photographing conditions and noise generation situation. In order to cope with such a problem, in the present embodiment, the bit value is determined depending on which of the distance in the clockwise direction between the hue values on the hue circle 320 and the distance in the counterclockwise direction is shorter, based on the hue value of each pixel included in the pixel pair corresponding to the bit value.

Specifically, assuming that the hue value of the first pixel included in the pixel pair is H1 and the hue value of the second pixel is H2, for example, the feature amount calculation unit 125 calculates the distance D in the clockwise direction between the hue value H1 and the hue value H2 on the hue circle 320. When the hue value H1 is equal to or smaller than the hue value H2, the feature amount calculation unit 125 calculates the distance D according to the following equation (3). In the meantime, when the hue value H1 is larger than the hue value H2, the feature amount calculation unit 125 calculates the distance D according to the following expression (4).

$$D=H2-H1 \qquad (3)$$

$$D=256-(H1-H2) \qquad (4)$$

Then, the feature amount calculation unit 125 determines the bit value to be 0 when the calculated distance D is equal to or smaller than a predetermined threshold value, and determines the bit value to be 1 when the distance D is larger than the threshold value. The threshold value is set to an intermediate value between the minimum value and the maximum value that the hue value may take, and is set to "128" in the present embodiment.

FIG. 27A illustrates a case where H1=10 and H2=220 as an example in which the hue value H1 is equal to or smaller than the hue value H2. In this case, D=210 is calculated from the equation (3) and, since it is larger than the threshold "128", the bit value is determined to be 1. In addition, FIG. 27B illustrates a case where H1=220 and H2=30 as an example in which the hue value H1 is larger than the hue value H2. In this case, D=66 is calculated from the equation (4) and, since it is smaller than the threshold value "128", the bit value is determined to be 0.

By determining the bit value in this manner, for example, even when the hue value takes a value near the minimum value "0" or the maximum value "255" and is likely to largely fluctuate due to the influence of photographing conditions and noise, the determined bit value does not change. For example, in the example of FIG. 27A, even when the hue value H1 of the first pixel is detected as 250, not 10, the bit value is determined to be 1 as in the case of H=10. In this way, since the bit value of the hue feature amount is hardly inverted, it is possible to calculate a hue feature amount with high robustness. As a result, it is possible to improve the accuracy of determination on similarity between images and the accuracy of image recognition.

When adopting the above-described method of calculating the hue feature amount, it is preferable to calculate a hue absolute value vector for calculating the usefulness of the hue feature amount as follows. When each of the hue value H1 and H2 of a pixel pair satisfies one of the following first condition and second condition, the usefulness calculation unit 123a determines the bit value corresponding to the pixel pair in the hue absolute value vector to be 0. Otherwise, the bit value is determined to be 1. Here, the absolute value of a value "X" is expressed as ABS(X).

The first condition is that ABS(H1−H2) is smaller than a predetermined threshold TH greater than 0. Here, the threshold value TH is set to a value larger than 0 and smaller than an intermediate value (128 in this case) between the minimum value and the maximum value that the hue value may take, preferably a value relatively close to 0, such as 20 or less. When such a first condition is satisfied, since the hue values H1 and H2 are close to each other on the hue circle 320, the positional relationship between the hue values H1 and H2 on the hue circle 320 is likely to be reversed. Therefore, when calculating the distance D based on such hue values H1 and H2, the corresponding bit value is likely to be inverted. Therefore, when the above first condition is satisfied, by determining the bit value of the hue absolute value vector to be 0, the luminance feature amount is more easily selected than the hue feature amount.

The second condition is that ABS (ABS(H1−H2)−128) is smaller than the threshold value TH. When this second condition is satisfied, between the hue values H1 and H2, a difference between the clockwise direction distance and the counterclockwise direction distance on the hue circle 320 is small. When calculating the distance D based on such hue values H1 and H2, the corresponding bit value is likely to be inverted. Therefore, even when the above second condition is satisfied, by determining the bit value of the hue absolute value vector to be 0, the luminance feature amount is more easily selected than the hue feature amount.

Further, when the second condition is satisfied, it may be said that the hue values H1 and H2 are almost opposite to each other on the hue circle 320 (i.e., they are in a complementary color relationship). For example, in an image of a signboard or a sign, when colors in a complementary color relationship are arranged, since halation occurs when the luminance difference therebetween is small, the luminance difference is often made large. Therefore, when the hue values H1 and H2 are in a complementary color relationship, since there is a high possibility that the luminance difference of the same pixel pair is large, the luminance feature amount rather than the hue feature amount is selected to further improve the accuracy of similarity determination. Therefore, when the second condition is satisfied, the bit value of the hue absolute value vector is determined to be 0 so that the luminance feature amount may be easily selected, thereby expecting an effect of significant improvement of the accuracy of similarity determination.

Next, the process of the image processing apparatus 100a will be described with a flowchart.

First, the image processing apparatus 100a executes a feature amount calculating process according to the steps S102 to S106 out of the steps illustrated in FIG. 17. That is, the step S101 is not executed. However, the processes executed by the usefulness calculation unit 123 and the feature amount calculation unit 125 in FIG. 17 are executed by the usefulness calculation unit 123a and the feature amount calculation unit 125a, respectively.

The usefulness calculating process of the step S103 is executed in a procedure illustrated in FIG. 28 below.

Figure 28:
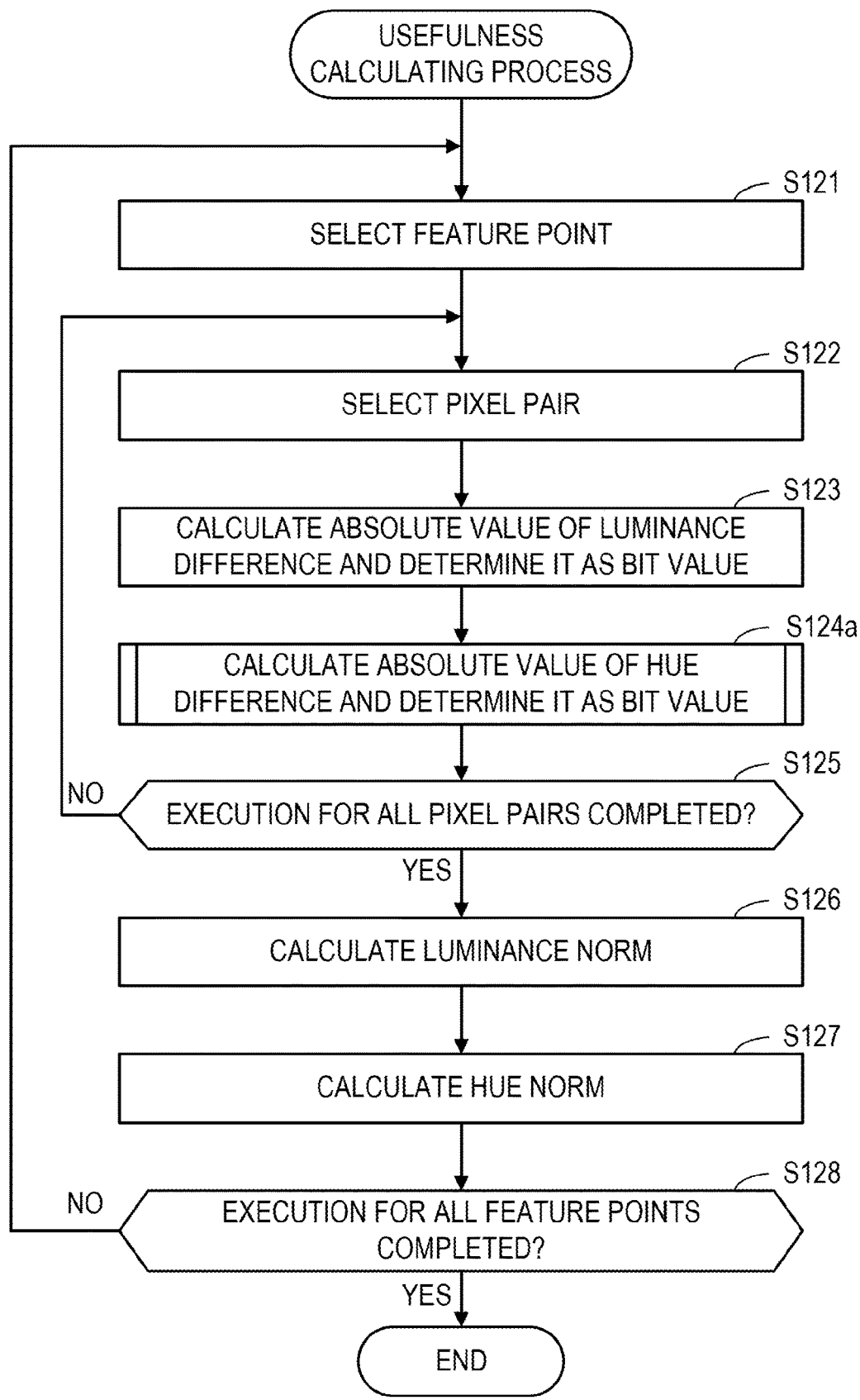
FIG. 28 is a flowchart illustrating an example of a usefulness calculating process.

FIG. 28 is a flowchart illustrating an example of a usefulness calculating process. In the flowchart illustrated in FIG. 28, a step S124a is executed instead of the step S124 among the steps illustrated in FIG. 19. Each process in FIG. 28 is executed by the usefulness calculation unit 123a instead of the usefulness calculation unit 123.

(Step S124a) The usefulness calculation unit 123a selects two pixels corresponding to the pixel pair selected in the step S122 from the feature region in a certain range centered on the feature point selected in the step S121, and calculates the absolute value of the hue difference between the selected pixels. Based on the calculated absolute value, the usefulness calculation unit 123 determines a bit value corresponding to the pixel pair selected in the step S112 in the hue absolute value vector according to the above-described equation (3) or equation (4).

Figure 29:
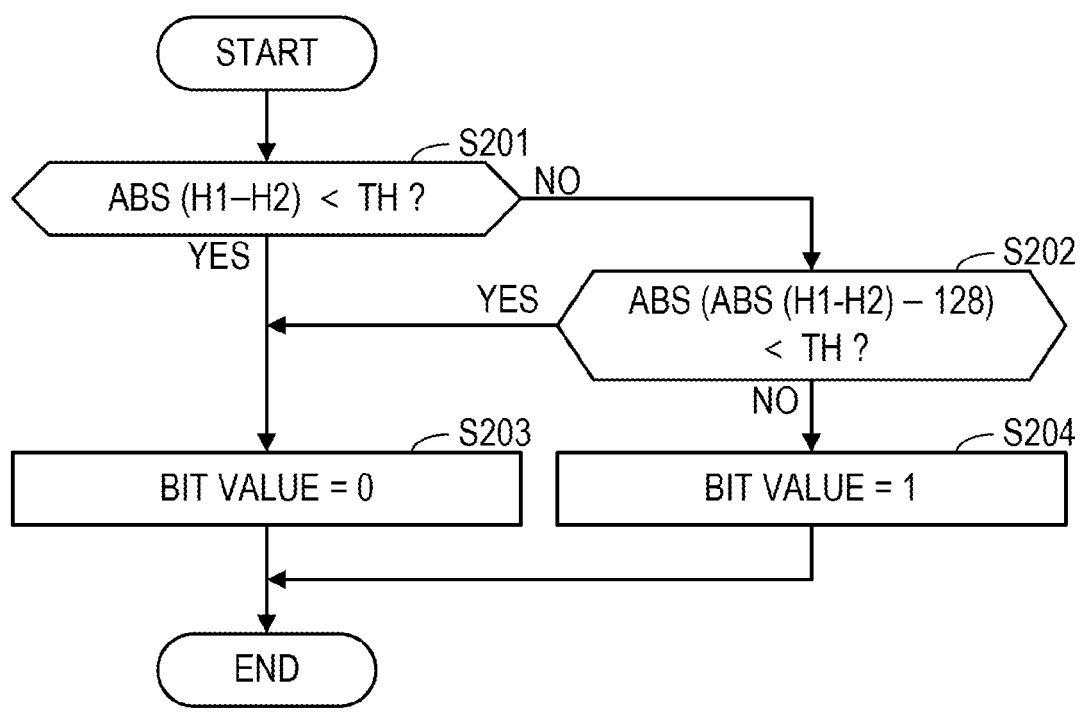
FIG. 29 is a flowchart illustrating an example of a hue absolute value vector bit value determining process.

FIG. 29 is a flowchart illustrating an example of a hue absolute value vector bit value determining process. The process of FIG. 29 corresponds to the step S124a in FIG. 28.

(Step S201) The usefulness calculation unit 123a determines whether the hue value H1 of the first pixel and the hue value H2 of the second pixel in the pixel pair selected in the step S122 satisfy the above-described first condition. The first condition is the condition that ABS(H1−H2) is smaller than the aforementioned threshold value TH. The usefulness calculation unit 123a executes a step S203 when the first condition is satisfied, and executes a step S202 when the first condition is not satisfied.

(Step S202) The usefulness calculation unit 123a determines whether the hue values H1 and H2 satisfy the above-described second condition. The second condition is the condition that ABS (ABS(H1−H2)−128) is smaller than the above threshold value TH. The usefulness calculation unit 123a executes the step S203 when the second condition is satisfied, and executes a step S204 when the second condition is not satisfied.

(Step S203) The usefulness calculation unit 123a determines the bit value corresponding to the pixel pair selected in the step S122 to be 0. The usefulness calculation unit 123a adds the determined bit value to the lower order of a bit string indicating the hue absolute value vector corresponding to the hue feature point.

(Step S204) The usefulness calculation unit 123a determines the bit value corresponding to the pixel pair selected in the step S122 to be 1. The usefulness calculation unit 123a adds the determined bit value to the lower order of the bit string indicating the hue absolute value vector corresponding to the hue feature point.

The feature amount selecting process of the step S104 is executed in the same procedure as in FIG. 21, and thus, an illustration thereof is omitted here. The feature amount registering process of the step S105 is executed in a procedure illustrated in FIG. 30 below.

Figure 30:
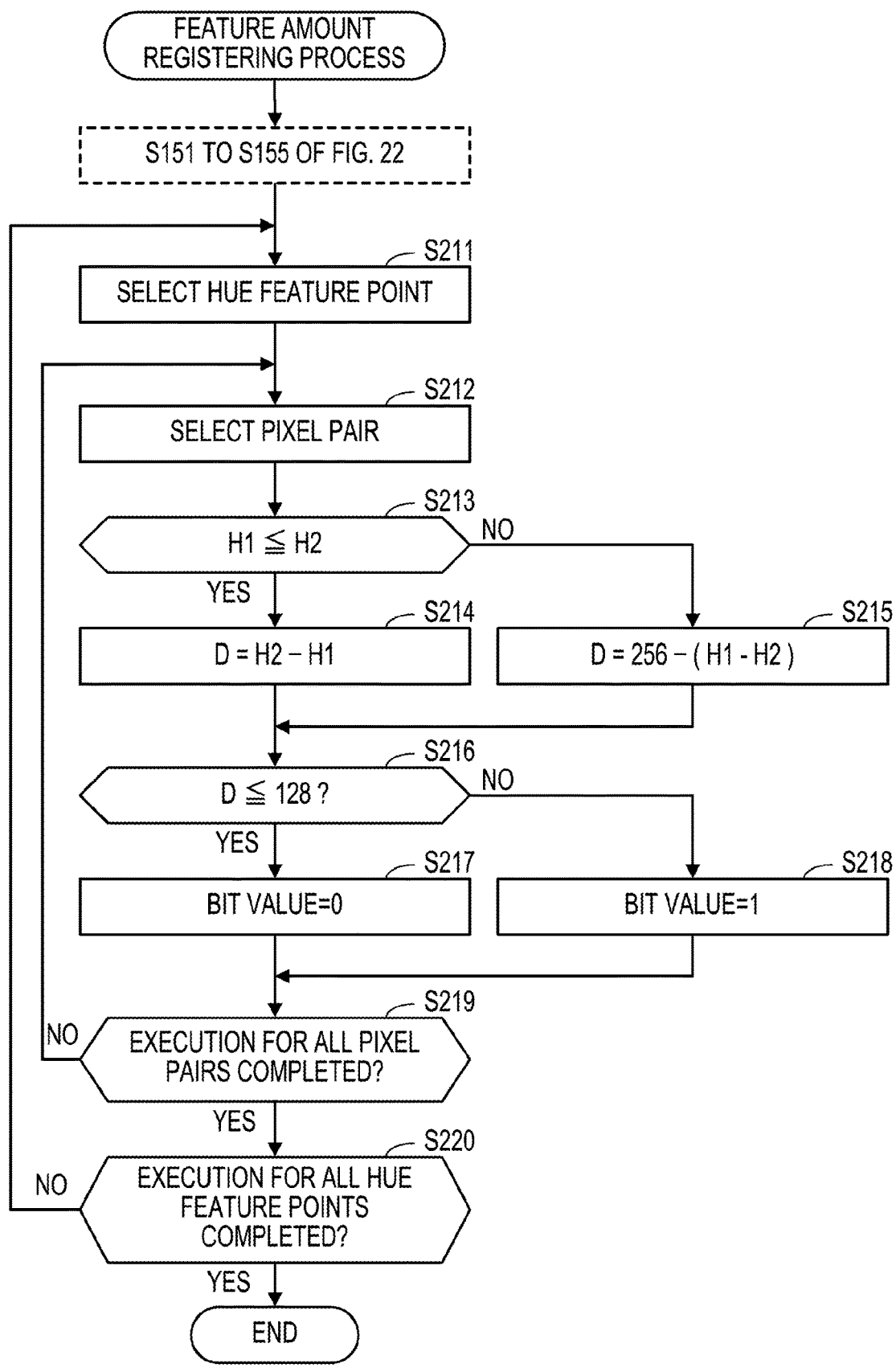
FIG. 30 is a flowchart illustrating an example of a feature amount registering process.

FIG. 30 is a flowchart illustrating an example of a feature amount registering process. In the flowchart illustrated in FIG. 30, the steps S151 to S155 illustrated in FIG. 22 are executed by the feature amount calculation unit 125a instead of the feature amount calculation unit 125 and then, steps S211 to S220 are executed.

(Step S211) The feature amount calculation unit 125a selects one hue feature point from the stored image selected in the step S102. In the actual process, the feature amount calculation unit 125a selects one record from the hue feature amount management table 115 corresponding to the stored image selected in the step S102.

(Step S212) The feature amount calculation unit 125a selects one pixel pair from the pixel pair management table 112.

(Step S213) The feature amount calculation unit 125a selects two pixels corresponding to the pixel pair selected in the step S112 from the feature region in a certain range centered on the hue feature point selected in the step S211, and calculates the hue value H1 of the first pixel and the hue value H2 of the second pixel. The feature amount calculation unit 125a determines whether the hue value H1 is equal to or smaller than the hue value H2. The feature amount calculation unit 125a executes a step S214 when the hue value H1 is equal to or smaller than the hue value H2, and executes a step S215 when the hue value H1 is larger than the hue value H2.

(Step S214) The feature amount calculation unit 125*a* calculates the clockwise direction distance D between the hue value H1 and the hue value H2 on the hue circle 320 according to the above equation (3).

(Step S215) The feature amount calculation unit 125*a* calculates the clockwise direction distance D between the hue value H1 and the hue value H2 on the hue circle 320 according to the above equation (4).

(Step S216) The feature amount calculation unit 125*a* determines whether the calculated distance D is equal to or smaller than the threshold value "128". The feature amount calculation unit 125*a* executes a step S217 when the distance D is equal to or smaller than 128, and executes a step S218 when the distance D is larger than 128.

(Step S217) The feature amount calculation unit 125*a* determines the bit value corresponding to the pixel pair selected in the step S212 to be 0. The feature amount calculation unit 125*a* adds the determined bit value to the lower order of a bit string indicating the hue feature amount corresponding to the hue feature point.

(Step S218) The feature amount calculation unit 125*a* determines the bit value corresponding to the pixel pair selected in the step S212 to be 1. The feature amount calculation unit 125*a* adds the determined bit value to the lower order of the bit string indicating the hue feature amount corresponding to the hue feature point.

(Step S219) The feature amount calculation unit 125*a* determines whether the steps S212 to S218 have been executed for all pixel pairs registered in the pixel pair management table 112. When there is an unexecuted pixel pair, the feature amount calculation unit 125*a* executes the step S212 to select the unexecuted pixel pair.

In the meantime, when the steps have been executed for all the pixel pairs, the generation of the bit string indicating the hue feature amount has been completed. In this case, the feature amount calculation unit 125*a* registers the generated bit string as the hue feature amount in the record selected from the hue feature amount management table 115 in the step S211.

(Step S220) The feature amount calculation unit 125*a* determines whether the steps S211 to S219 have been executed for all the hue feature points. When there is an unexecuted hue feature point, the feature amount calculation unit 125*a* executes the step S211 to selects the unexecuted hue feature point. In the meantime, when the steps have been executed for all the hue feature points, the feature amount calculation unit 125*a* ends the process.

Through the above process of FIG. 30, for all feature points in a stored image, one of the luminance feature amount and the hue feature amount is calculated and registered in the storage unit 110. In particular, in the present embodiment, the hue feature amount is calculated not from the difference between the hue values but depending on which of the clockwise direction distance between the hue values o in the hue circle 320 and the counterclockwise direction distance is shorter. Thus, even when many pixels of a specific hue (e.g., red) are generated in an image to be searched, it is possible to calculate a stable hue feature amount robust against illumination conditions and noise. As a result, it is possible to improve the accuracy of similarity determination between images and the accuracy of image recognition.

The processing functions of the apparatuses illustrated in the above embodiments (the image processing apparatuses 1, 2, 100 and 100*a*) may be implemented with a computer. In that case, a program describing the processing contents of functions of each apparatus is provided and the processing functions are implemented on the computer executing the program. The program describing the processing contents may be recorded on a computer-readable recording medium including, for example, a magnetic storage device such as a hard disk drive (HDD), a flexible disk (FD), or a magnetic tape, an optical disk such as a DVD (Digital Versatile Disc), DVD-RAM, CD-ROM (Compact Disc-Read Only Memory), or CD-R (Recordable)/RW (ReWritable), a magneto-optical recording medium such as a MO (Magneto-Optical disk), a semiconductor memory, etc.

In a case of distributing the program, for example, a portable recording medium such as DVD or CD-ROM in which the program is recorded is sold. Further, the program may be stored in a storage device of a server compute and may be transferred from the server computer to another computer via a network.

A computer that executes the program may store the program recorded in a portable recording medium or the program transferred from a server computer in its own storage device. Then, the computer may read the program from its own storage device and execute a process according to the program. The computer may also read the program directly from the portable recording medium and execute the process according to the program. In addition, each time a program is transferred from a server computer connected via a network, the computer may sequentially execute the process according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   determining a base hue value based on a frequency of appearance of a hue value of each pixel of at least one image;
   converting a first hue value of each pixel of the at least one image into a second hue value based on the base hue value;
   calculating a difference in the second hue value between pixels included in each of a plurality of pixel pairs set in at least one feature region in the at least one image; and
   calculating a local feature amount of each of the at least one feature region based on the difference in the second hue value.

2. The non-transitory computer-readable recording medium according to claim 1, wherein the at least one image includes a first image and a second image, and
   the process further comprises:
   determining the base hue value based on a frequency of appearance of the hue value of each pixel of the first image and the second image;

comparing the local feature amount between the first image and the second image; and determining similarity between the first image and the second image based on a result of the comparison.

3. The non-transitory computer-readable recording medium according to claim 2, wherein the at least one feature region set in each of the first image and the second image includes a plurality of feature regions, and the process further comprises:

classifying each of the plurality of feature regions included in each of the first image and the second image into first feature regions in which a first feature amount is calculated based on luminance or second feature regions in which the local feature amount is calculated as a second feature amount; and determining the similarity between the first image and the second image using the first feature amount calculated for the first feature regions and the second feature amount calculated for the second feature regions.

4. The non-transitory computer-readable recording medium according to claim 3, the process further comprising:

determining, for each of the plurality of feature regions, which is more stable the first feature amount or the second feature amount based on a first index or a second index, the first index being acquired based on a difference in luminance between the pixels included in each of the plurality of pixel pairs, the second index being acquired based on a difference in the second hue value between the pixels included in each of the plurality of pixel pairs; and classifying each of the plurality of feature regions into the first feature regions or the second feature regions based on a result of the determination on the stability.

5. An apparatus for processing an image, the apparatus comprising:

a memory; and a processor coupled to the memory and the processor configured to:

determine a base hue value based on a frequency of appearance of a hue value of each pixel of at least one image;

convert a first hue value of each pixel of the at least one image into a second hue value based on the base hue value;

calculate a difference in the second hue value between pixels included in each of a plurality of pixel pairs set in at least one feature region in the at least one image; and calculate a local feature amount of each of the at least one feature region based on the difference in the second hue value.

6. A method of processing an image, the method comprising:

determining, by a computer, a base hue value based on a frequency of appearance of a hue value of each pixel of at least one image;

converting a first hue value of each pixel of the at least one image into a second hue value based on the base hue value;

calculating a difference in the second hue value between pixels included in each of a plurality of pixel pairs set in at least one feature region in the at least one image; and calculating a local feature amount of each of the at least one feature region based on the difference in the second hue value.

* * * * *